United States Patent [19]
Moorby et al.

[11] Patent Number: 5,892,507
[45] Date of Patent: Apr. 6, 1999

[54] COMPUTER SYSTEM FOR AUTHORING A MULTIMEDIA COMPOSITION USING A VISUAL REPRESENTATION OF THE MULTIMEDIA COMPOSITION

[75] Inventors: Philip R. Moorby, Boxford; John S. Robotham, Belmont, both of Mass.; Philip Mason, Nashua, N.H.

[73] Assignee: Avid Technology, Inc., Tewksbury, Mass.

[21] Appl. No.: 689,577

[22] Filed: Aug. 12, 1996

Related U.S. Application Data

[63] Continuation of Ser. No. 417,974, Apr. 6, 1995, abandoned.

[51] Int. Cl.$^6$ ........................................................ G06F 3/00
[52] U.S. Cl. ............................ 345/302; 345/328; 345/348
[58] Field of Search .................................... 395/762, 615, 395/806, 807, 326, 327, 328, 334, 348, 349, 967; 707/501, 104; 345/302, 326, 327, 328, 334, 348, 349, 967

[56] References Cited

U.S. PATENT DOCUMENTS

| | | | |
|---|---|---|---|
| D. 391,558 | 3/1998 | Marshall, Jr. et al. | D14/114.1 |
| D. 392,264 | 3/1998 | Marshall, Jr. et al. | D14/114.1 |
| D. 392,267 | 3/1998 | Mason et al. | D14/114.3 |
| D. 392,268 | 3/1998 | Mason et al. | D14/114.3 |
| D. 392,269 | 3/1998 | Mason et al. | D14/114.3 |
| D. 395,291 | 6/1998 | Mason et al. | D14/114.3 |
| 5,307,456 | 4/1994 | MacKay | 345/328 |
| 5,317,732 | 5/1994 | Gerlach, Jr. et al. | 707/104 |
| 5,390,138 | 2/1995 | Milne et al. | 381/119 |
| 5,515,490 | 5/1996 | Buchanan et al. | 345/302 |
| 5,539,869 | 7/1996 | Spoto et al. | 345/336 |
| 5,592,602 | 1/1997 | Edmunds et al. | 345/474 |
| 5,619,636 | 4/1997 | Sweat et al. | 345/302 |
| 5,652,714 | 7/1997 | Peterson et al. | 364/550 |
| 5,659,790 | 8/1997 | Kim et al. | 345/302 |
| 5,659,793 | 8/1997 | Escobar et al. | 345/302 |
| 5,680,619 | 10/1997 | Cudmundson et al. | 395/701 |
| 5,724,605 | 3/1998 | Wissner | 345/302 |
| 5,752,029 | 5/1998 | Wissner | 707/103 |
| 5,754,851 | 5/1998 | Wissner | 707/104 |

FOREIGN PATENT DOCUMENTS

WO88/07719  10/1988  WIPO .

OTHER PUBLICATIONS

*Authorware Users Guide*, Macromedia Inc., 1992, pp. 8, 9, 12, 13, 15, 17, 20, 25, 28–31, 36,37, 43, 46, 47, 115, 178, 179, 191, 232, 242, 301, 302.

*Macromind Mediamaker*, Macromind Inc., 1990, pp. 129, 165 and 166.

J.N. Agnew, et al., "The Right Tool for the Job: A Quest for the Perfect Authoring Package", Proceedings of SIGDOC '92: 10th Annual ACM Conference on Systems Documentation, Oct., 1992, Ottawa, Ontario, Canada, pp. 253–258.

H. Hardman, "New Authoring Tools for Windows", BYTE, vol. 18, No. 9, Aug. 1993, pp. 153–156.

(List continued on next page.)

*Primary Examiner*—Stephen S. Hong
*Attorney, Agent, or Firm*—Wolf, Greenfield & Sacks, P.C.

[57] ABSTRACT

A computer system, having a graphical user interface for authoring and playing a multimedia presentation having one or more multimedia events, displays a representation of a story, including a representation of a start position, indicating the beginning of the multimedia presentation, a representation of an end position, indicating the end of the multimedia presentation, and a representation of a unidirectional path line connecting the start position and the end positions. The representation of at least one icon, associated with a source of multimedia material, may be linked to the path line. The link, called a call spot, represents a call to the multimedia, allowing icons to be shared by many presentations or to be shown at different times in the same presentation. The multimedia presentation starts at the start position, plays the multimedia material represented by the at least one icon, and then continues along the unidirectional path line and completes at the end position.

19 Claims, 18 Drawing Sheets

OTHER PUBLICATIONS

J.F. Koegel, et al., "Improving Visual Programming Languages for Multimedia", Educational Multimeida and Hypermedia Annula, 1993, Proceedings of ED–Media 93–World on Educational Multimedia and Hypermedia, Jun. 1993, Orlando, FL, pp. 286–293

R. Gruenette, "Authorware and IconAuthor", CD–ROM Professional, vol. 8, No. 10, Oct. 1995, pp. 81–98.

COMPUTER SYSTEM FOR AUTHORING A MULTIMEDIA COMPOSITION USING A VISUAL REPRESENTATION OF THE MULTIMEDIA COMPOSITION

This application is a continuation of application Ser. No. 08/417,974, filed Apr. 6, 1995, now abandoned.

FIELD OF THE INVENTION

The present invention relates generally to multimedia authoring and playing apparatus and methods and particularly to the creation of a user-friendly graphical interface which allows a sequence of multimedia presentations to be graphically designed, analyzed and played.

BACKGROUND OF THE INVENTION

The desire to capture, store, manipulate, view and interact with textual material, image material, animation material and audio material has been a driving force in the development of recording, processing and distribution systems. The present application has particular application in the field of multimedia, where the user authoring a multimedia presentation desires to combine textual, audio and video images in a given sequence and combination. In fact, as time goes by and people become more familiar with multimedia production systems, the ability and interest to interact with the media is becoming an everyday part of life. An example of this is the evolution of computer games, which is a prime example of the emergence of interactive multimedia. Computer games began exclusively with text-based interaction. As the technology evolved, the means for rendering images on a home television became possible. Sound generation then became widespread. The advent of the integrated circuits, powerful microprocessors and less expensive memory made the creation of games with visual, auditory and interactive elements common place today. A modern video game is an interactive multimedia "story" where the story is preprogrammed at the factory and does not allow (usually) customization by the end-user.

As the technology for creating, manipulating and presenting various forms of media on standard desk top computers such as PCs and Macintoshes has become more widespread, there has been a need for techniques and systems for organizing and presenting multimedia "stories" on these platforms in order to make it easier for a wider and wider audience of users to author such multimedia stories, whereas in the past the authoring of a multimedia presentation would likely be left to a professional whose training is specifically to produce such stories. As multimedia becomes more popular and spreads in usage, persons even without specialized training may well be called upon to author some type of multimedia presentations.

In the prior art which addresses these needs, exemplary techniques for authoring stories include computer scripting languages, timelines, hyperlinked card stacks, frame-by-frame animation and icon flow charts. An example of a programmed computer using an icon flow chart is a program entitled "IconAuthor", available from AimTech of Nashua, N.H. Prior art systems, such as the "IconAuthor" program, have advantages and disadvantages and each works well for a particular size, scope and general content of a story to be authored. The prior art systems fail, however, to allow the authoring of stories that combine all the following attributes: (1) simplicity and ease in describing basic story themes; (2) the introduction of interactivity into a linear story to make it non-linear; (3) the visualization at the user interface of the content and structure of the story being authored; (4) the ability to reuse and customize the story's content and structure; (5) the creation of large scale stories through hierarchical composition techniques; (6) the creation of repetitive story structures in which entire sub-structures are used more than once; (7) the ability to represent a range of programming semantics (calls, GOTOs, parallel invocation, mutual exclusion) in a simple visual language; (8) the visual representation of common multimedia objects and functions (buttons, synchronization, timelines, media icons) integrated into the same visual programming language; and (9) the ability to intermix a standard textual programming language with the visual programming language.

Thus, there is a need for easy-to-author multimedia stories. There is also a desire to provide easy-to-author multimedia stories using a visual language that provides a range of capabilities similar to those found in a modern text-based programming language (which includes calls, GOTOs, subroutines, looping, data types, abstract classes, modular decomposition, parallelism constructs, recursion, mutual exclusion, programmatic changes to the content flow, etc.).

SUMMARY OF THE INVENTION

As will be described in greater detail below, the present invention combines those programming attributes within the structure of time-based multimedia presentations (having the facilities of sequenced playback, user interaction, timelines, synchronization, events and actions) and presents them in a simple, compact, visual and easy to understand form of representation and presentation in the form of what is termed for the purposes of this invention a StoryLine.

The invention makes use of well known techniques in which an icon or other symbol represents a particular action, set of instructions or data file, such as in Microsoft's Windows Operating System or Apple Computer Company's Macintosh Operating System. However, in the environment of the present invention, the icon or other similar symbol represents a given amount of information or object which may be video data, textual data or audio data or a particular file or instruction. This icon representation may be moved about on the screen by a user and interconnected or linked with other icons to form a multimedia story.

Thus, without having to actually manipulate sound or video materials, the graphical user interface of the present invention provides a representation of each of those pieces of information which may be manipulated by the user in a fashion he or she desires on the screen, using a mouse or another cursor pointing device.

Once the user has linked the various materials or objects in the desired format, the information may be retrieved in the order established by the user or, in the case of a multimedia presentation, the multimedia presentation's "story" can be "played". This has the advantage that even an unsophisticated user may author somewhat complex presentations without knowing much about computers by simply taking a icon, symbol or other representation of a particular type and given amount of data and manipulating that image on the user's computer screen. The underlying program possesses the intelligence to react to the movement of the representation or symbol on the user's computer screen and manipulate the underlying data which the symbol represents on the user's computer screen. Such programs are well known, such as Macromedia Director available from Macromedia, of San Francisco, Calif. The data structure underlying the operation of the present invention may be a series of conventional data structure links well known to those skilled in the art which link various pieces of multimedia material.

Thus, from the user's point of view, the movement and interaction of data may be accomplished simply by connecting and interacting icons on the user's screen. The present invention thus provides for the capture of a certain amount and type of data as designed by the user or another, such as a video clip or music, and the association of that particular data set with a particular icon representation or symbol.

In response to the need for a simplified yet elegant means to graphically define a story which is authored by a user, the inventors have created a format for the authoring, editing and presentation of multimedia events in a story context which is visual in form and language and which is termed by the inventors as StoryBase Visual Language (SVL). At its base level, SVL provides a programmed computer system which, viewed by the user, graphically presents the sequencing of a series of multimedia events in a structural manner so that the user can "see and feel" the hierarchy of the story. A computer programmed with the invention of the present application unambiguously describes, in a unidirectional line on the computer screen (left to right, up to down, etc.), a known sequence of multimedia events. StoryBase is thus a visual tool or editor and player which expresses the contents of a StoryLine, as explained below.

SVL provides a visual representation of the structure of the story being authored and facilitates the reuse and customization of the story's content and structure. SVL is a graphical computer language and almost all the important information regarding the user's story is provided in a concise visual format. SVL provides a number of SVL "objects", and each class of SVL objects has independent attributes and behaviors and it is the interrelationship of these independent objects which form the description of the story's content and structure. SVL objects communicate with one another by messages, some of which are internal and others which may be user-defined. StoryBase provides a multimedia user with a tool to capture, store, manipulate, compose, view, share, reuse and distribute multimedia stories.

SVL has a number of graphical components for composing the structure of a story. One is called a TimeLine and a second a StoryLine (a term referred to above). Yet another is entitled a Sequence. In a TimeLine, icons representing the story's contents are scaled to depict the length of the presentation of the material for that icon and are placed in proximity to other icons to show timing, synchronization and composition relationships between icons.

StoryLines are more abstract and represent interactivity, story flow and content reuse and form the basic structure of the present invention. A StoryLine always begins with a starting point, called a Start Spot, described in detail below, an ending point, called an End Spot, also described below, and a line, called a Path Line, connecting the two. "Movement", that is, the sequencing of multimedia events, is always in one direction, from start to finish. StoryLines have an advantage over prior art flow chart methods of presenting multimedia events and sequences in that such systems do not allow the sharing of icons in multiple stories (without duplication of icons).

A Sequence is a simple, seriatim-ordered collection of icons. When a Sequence is played, each of the icons is played in order, left to right, top to bottom if there is more than one row of icons. TimeLines, Sequences and StoryLines can work together to describe story content. TimeLines can also be included as part of StoryLines. It is to be understood that references in this specification to a "StoryLine" or "StoryLines" means the graphical representation of a series of events which together make up a multimedia story. Sequences can, as well, be linked to and called from a StoryLine. Furthermore, all three types, StoryLines, TimeLines and Sequences can be combined, as will be described and illustrated below.

Most stories contain scenery, characters and audio material, and thus these must be placed, through the use of Call Spots, described below, along the Path Line between the Start and End Spots to insure they are "played". In a StoryLine, icons (such as Media Icons, Action Icons, Link Icons and Buttons, discussed in detail below) are used along the Path Line to represent the contents (such as scenery, characters, audio portions, etc.) of the story. These icons are connected by "links" to the Path Line called Call Spots in the present invention. Because the computer can store information in many ways, icons can store story content by utilizing many different kinds of computer-based file formats. Data may be stored in a file entitled a StoryBase Project File, which is a data file internal to the computer on which StoryBase is running. The StoryBase Project File stores the StoryLines during editing and playing of such StoryLines. In addition, if desired, StoryLines may be stored in an external storage medium or computer. A StoryLine, once completed or partially completed, may be played using the Media Pipeline and Media Composer products available from the assignee of the present application. In addition, the StoryLine for a particular Story may be stored within the Project File itself, while the data (multimedia clips and sequences) are stored in separate computer files within the host computer running the StoryLine or even in an external computer.

The position of the icons along the Path Line determine the sequence by which the story is played back to the viewer. Thus, as in all narrative or storytelling methods, StoryLines have ways of representing the beginning of the story, its middle portions and the end of the story. These are drawn and displayed on the user's computer screen as different kinds of spots and icons interconnected along one or more unidirectional set of lines, the graphical representation of which are described below. The Path Line interconnecting the Call Spots show how the story flows from one spot to the next and also calls to sub-stories, TimeLines, Actions or other icons, described in detail below. The sum of the interconnected spots, lines and icons comprise a StoryLine. The most fundamental StoryLine contains a Start Spot, a Path Line and an End Spot, but, of course, this basic StoryLine has no "story" to be played. Thus, the most basic meaningful StoryLine contains a Start Spot, an End Spot, a Path Line connecting the Start and End Spots, at least one Call Spot along the Path Line, a Call Line connected to the Call Spot on one end and to an Object or Icon at the other end which may represent a multimedia sequence to be played.

An advantage of the present invention is that the story can be represented graphically and unambiguously without the use of arrows, arrowheads or other explicit direction or clues. Stories logically flow from beginnings (Start Spots) to ends (End Spots) along Path Lines. This means that a Path Line can be drawn in any arbitrary way on the computer screen, provided that the line is continuous and does not cross itself, and still preserve an unambiguous ordering of the story from the Start Spot through the End Spot. When a Call Spot with at least one Call Line is encountered, the story flow diverts to the called material represented by the Call Spot and returns when the called material finishes being played. Showing the sequence of playing multimedia events in this fashion—with single lines and overall movement to the end spot—is unique to the present invention. The user is allowed the freedom of reusing icons without duplicating them as would be required by typical flow chart paradigms. Icons can have many Call Lines connecting them to many StoryLines. Icons can be reused in the same StoryLine and shared among a number of StoryLines.

Thus, there is provided in the present invention a apparatus and method for organizing symbols and icons and other representations to form a visual depiction of a story based upon the connection of a number of icons, symbols and other representations. A StoryLine begins with a Start Spot. When an End Spot is reached, the story flow reverts to the caller/originator of the just completed StoryLine, which may be another StoryLine, TimeLine, Sequence or a terminating event (such as the end of the multimedia sequence).

In addition to the basic StoryLine formats discussed above, the present invention provides two further basic attributes: parallelism and alternative story lines. By parallelism is meant that a Call Spot may initiate the playing of more than one multimedia event, such as playing a video clip and a sound track to begin at the same time. This is represented on the user's computer screen in a simple and easily-understood manner by having more than one Call Line emanate from a particular Call Spot. In Alternative StoryLines, an icon representing a multimedia event may be "joined to" two distinct or separate StoryLines, as will be described in detail below.

Thus, in summary, the present invention describes an apparatus and method of visual programming for simply and visually representing multiple, sequential, concurrent, parallel, alternative, hierarchical and interdependent multimedia actions and events. This is accomplished through the basic modality of a StoryLine. A StoryLine begins with one of a number of Start Spots and ends with any one of a number of End Spots. A Path Line connects the Start Spot and the End Spot. Between the Start Spot and the End Spot, in any meaningful story, any of a number of Call Spots are connected to the Path Line. As their name denotes, they are denoted as Call Spots because they cause the StoryLine to "call" the multimedia event or other action connected to the Call Spot through one or more Call Lines. There may be multiple Call Lines connected to one Call Spot, facilitating the playing of a number of multimedia events in parallel. The sequence of beginning and ending the play of multimedia events in sequence, in parallel, and the ability to selectively end all or some of the playing of those multimedia events is controlled through the choice of the particular Call Spot chosen, to be described in detail below. Most of all, the graphical display of the various Start Spots, End Spots and Call Spots, among other things, gives the user a short "outline" of the sequence and interaction of the playing of a multimedia event or events. The timing of the play of multimedia events is controlled and displayed in graphical form through the use of TimeLines associated with StoryLines, either by a connecting a TimeLine to the Path Line or calling a StoryLine from a TimeLine, as will be described in detail below. The ability to permit or block the playing of a particular multimedia sequence may be controlled through the graphical imposition of Buttons associated with a StoryLine.

DETAILED DESCRIPTION OF THE DRAWINGS

FIG. 1 illustrates a simple StoryLine.

FIGS. 2(a)–2(f) illustrate various End Spots which are used to direct the activity of icons along a StoryLine.

FIG. 3 illustrates the form of various Start Spots.

FIGS. 4(a)–(b) illustrate forms of Media Icons and icons that represent links to other SVL objects.

FIGS. 4(c)–(d) illustrate forms of Triggerable Icons, such as Buttons and Script Functions FIG. 5 illustrates various forms of Call Spots.

FIG. 6 illustrates various forms of Actions.

FIGS. 7(a)–(b) illustrate the playing of StoryLines.

Figure 10A:
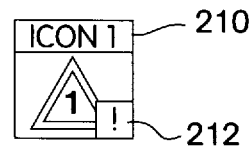
Figure 10B:
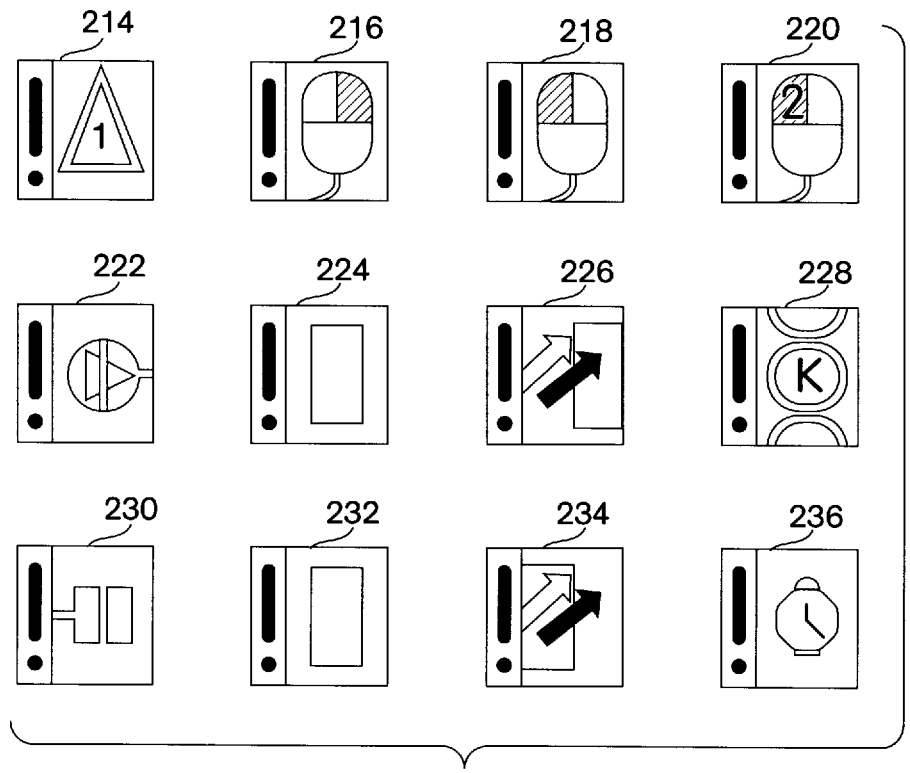

FIGS. 10(a)–(b) illustrate the form of the EventSpace Adornment and various Event Handlers.

Figure 11A:
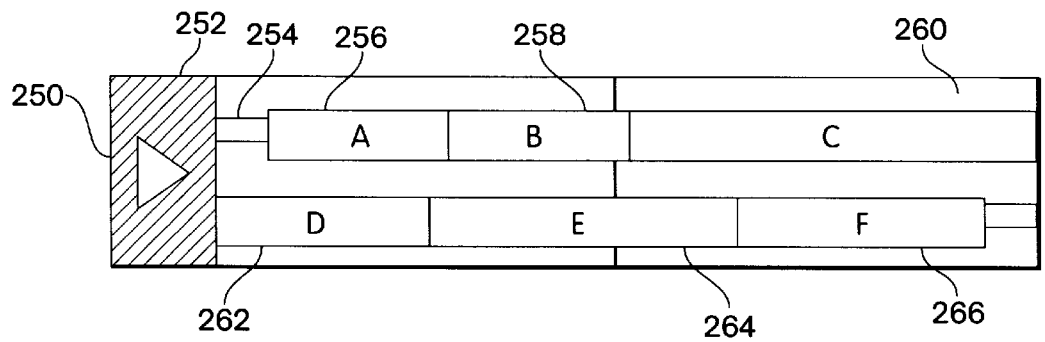
Figure 11B:
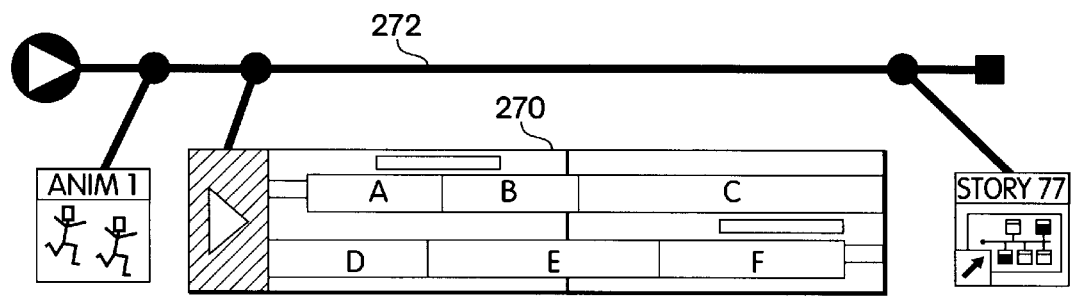
Figure 11C:
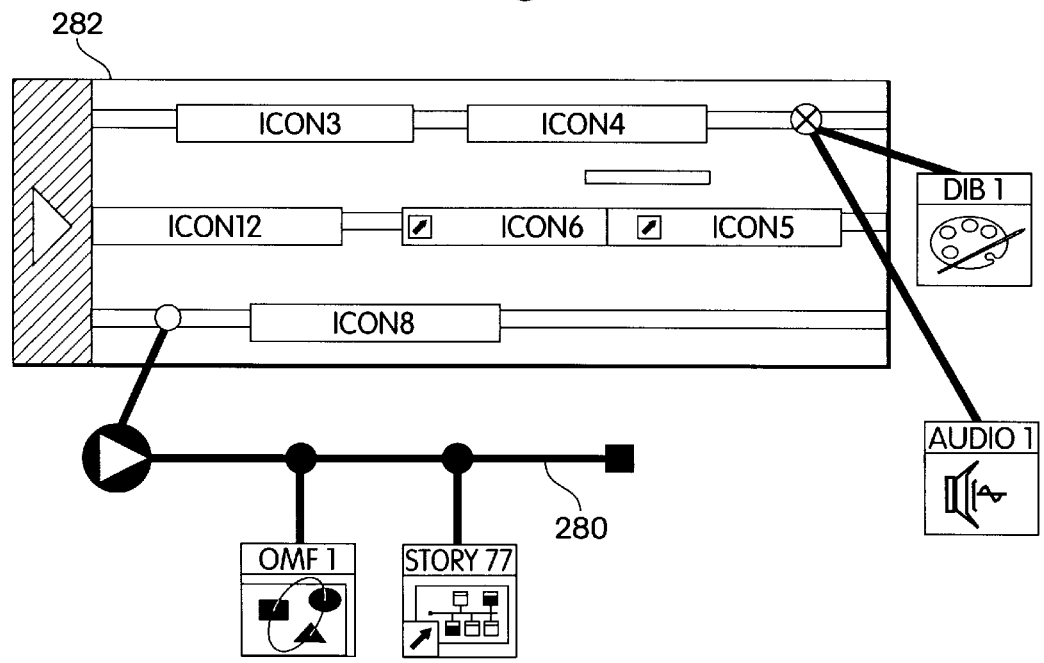

FIGS. 11(a)–(c) illustrate the use of TimeLines.

Figure 12A:
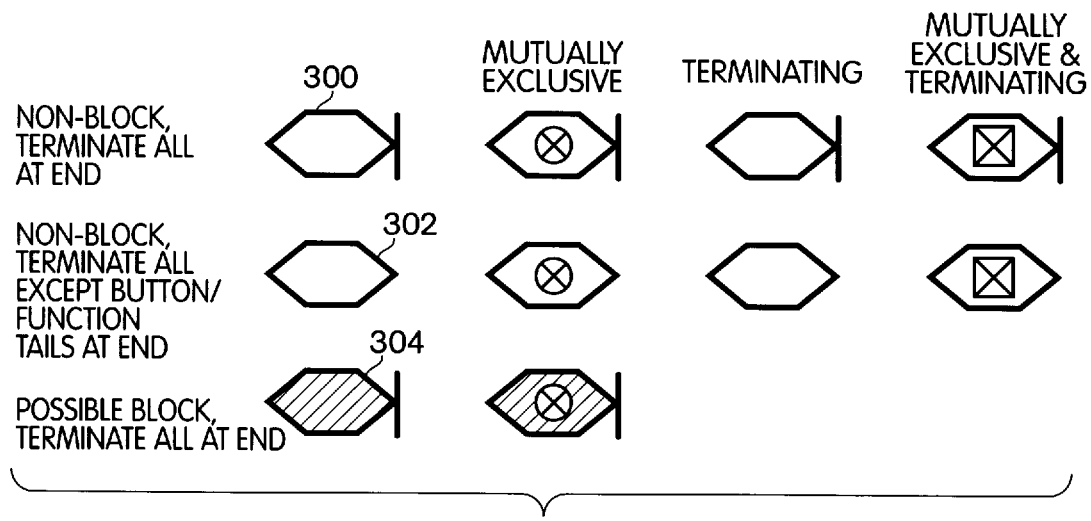
Figure 12B:
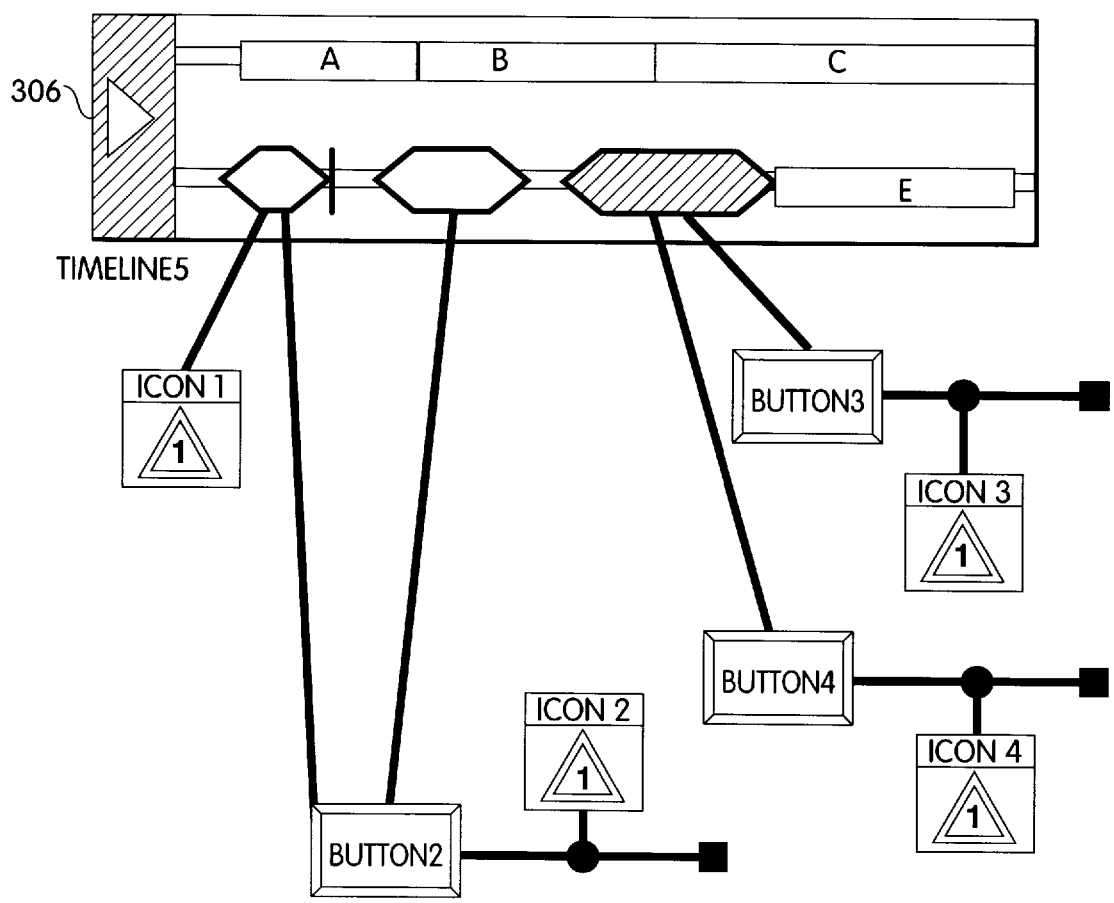

FIGS. 12(a)–(b) illustrate the operation of Activation Regions.

Figure 13A:
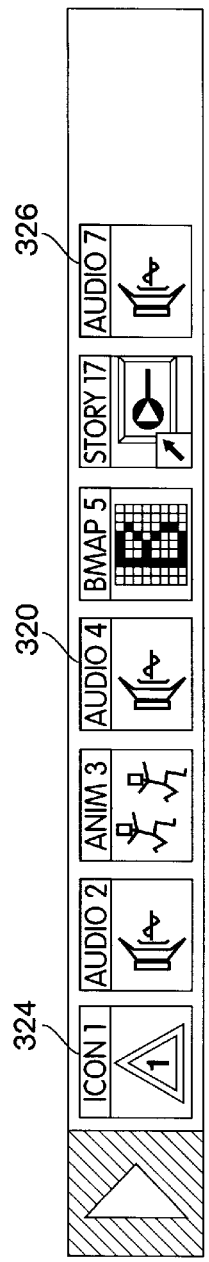
Figure 13B:
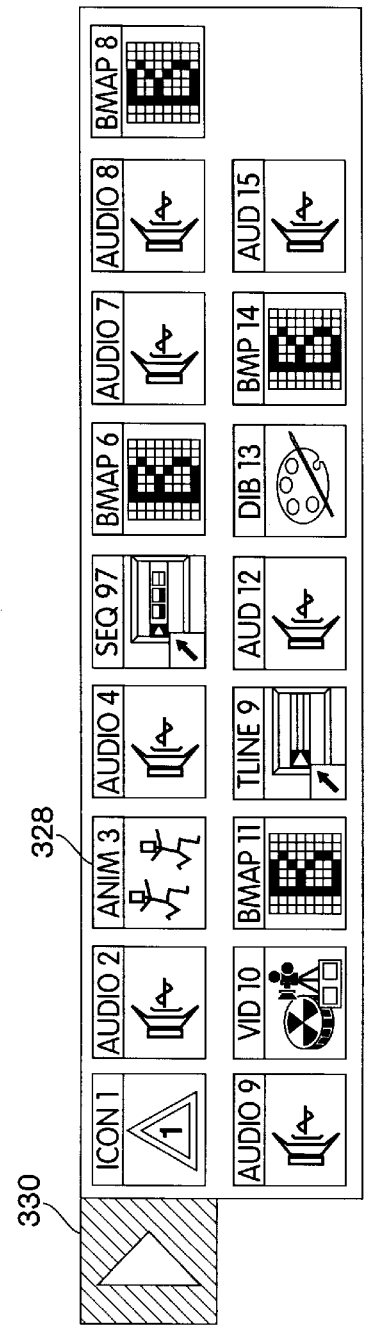
Figure 13C:
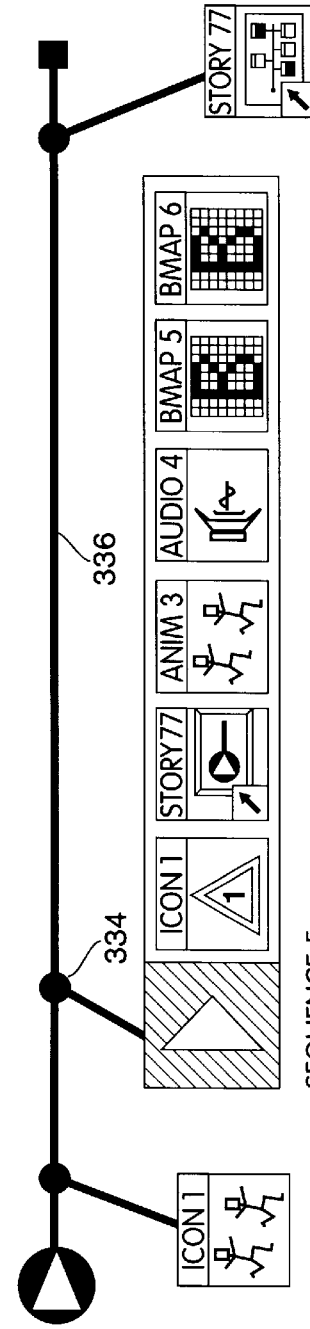

FIGS. 13(a)–(c) illustrate the operation of Sequences.

Figure 14:
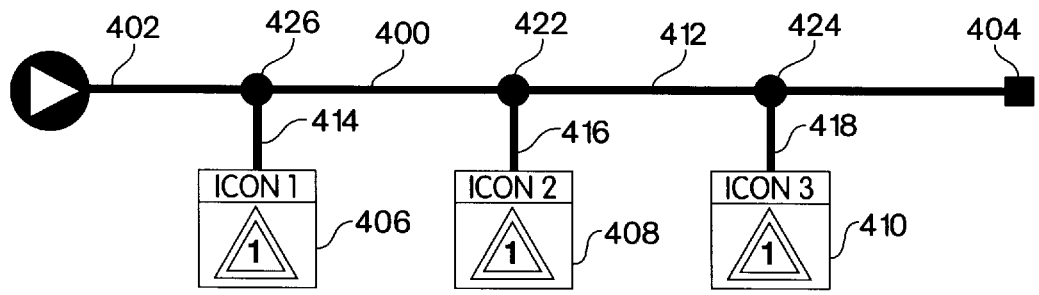

FIG. 14 illustrates a StoryLine with sequential icons.

Figure 15:
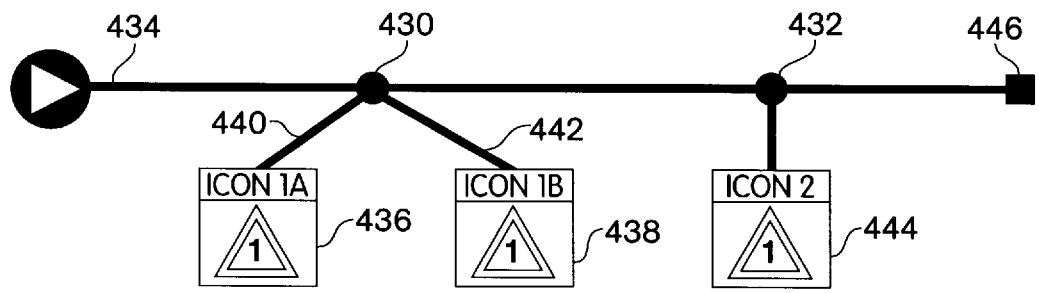

FIG. 15 illustrates a StoryLine with parallel icons.

Figure 16:
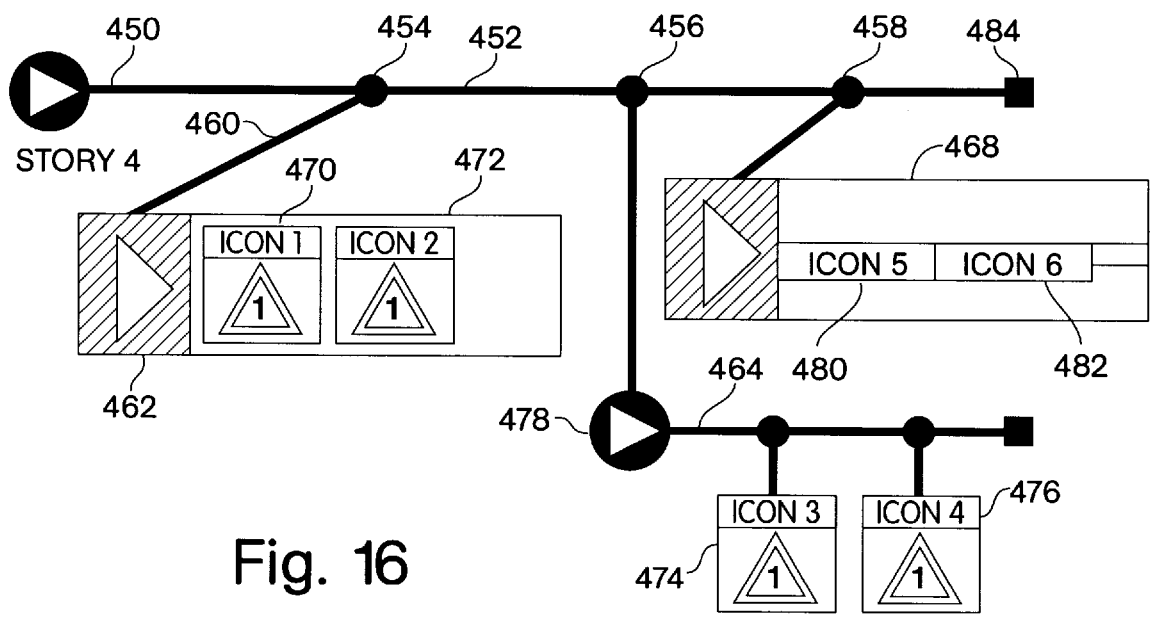

FIG. 16 illustrates a StoryLine with calls to a Sequence and a TimeLine.

Figure 17:
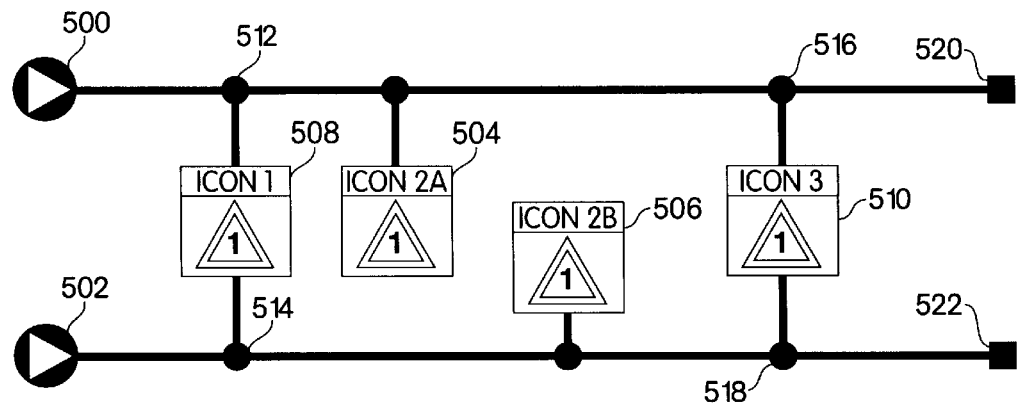

FIG. 17 illustrates the use of common icons for multiple, alternative StoryLines.

Figure 18:
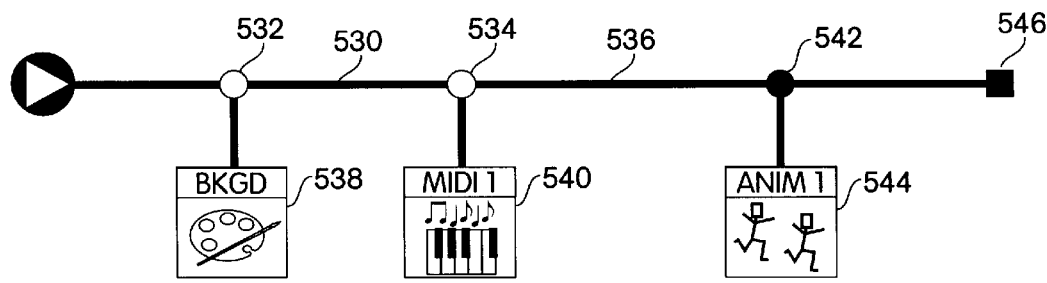

FIG. 18 illustrates the use of Call Spots in a StoryLine.

Figure 19:
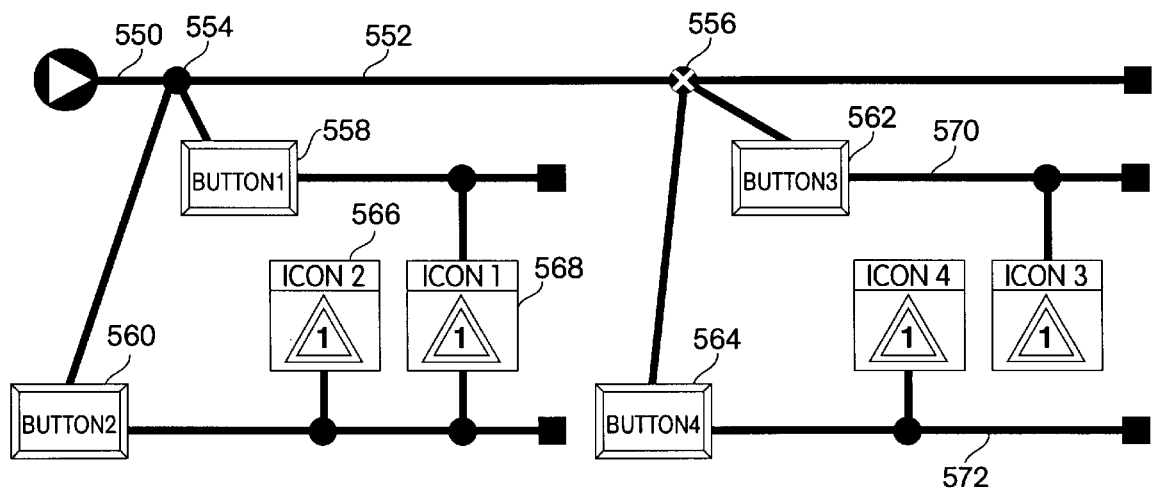

FIG. 19 illustrates another use of Call Spots in a StoryLine.

Figure 20:
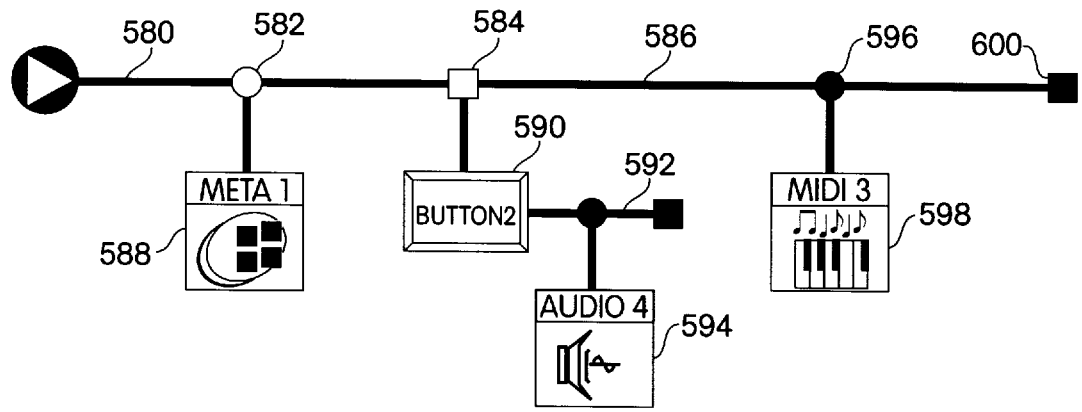

FIG. 20 illustrates another use of Call Spots in a StoryLine.

Figure 21:
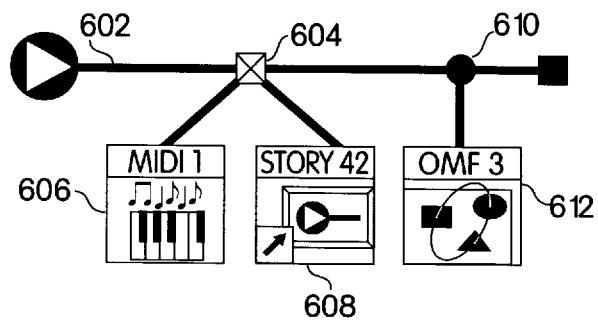

FIG. 21 illustrates another use of Call Spots in a StoryLine.

Figure 22:
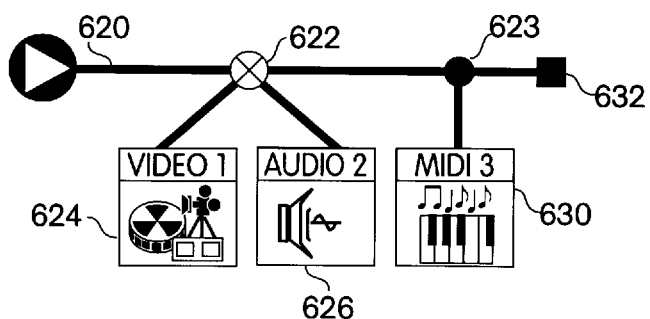

FIG. 22 illustrates another use of Call Spots in a StoryLine.

Figure 23:
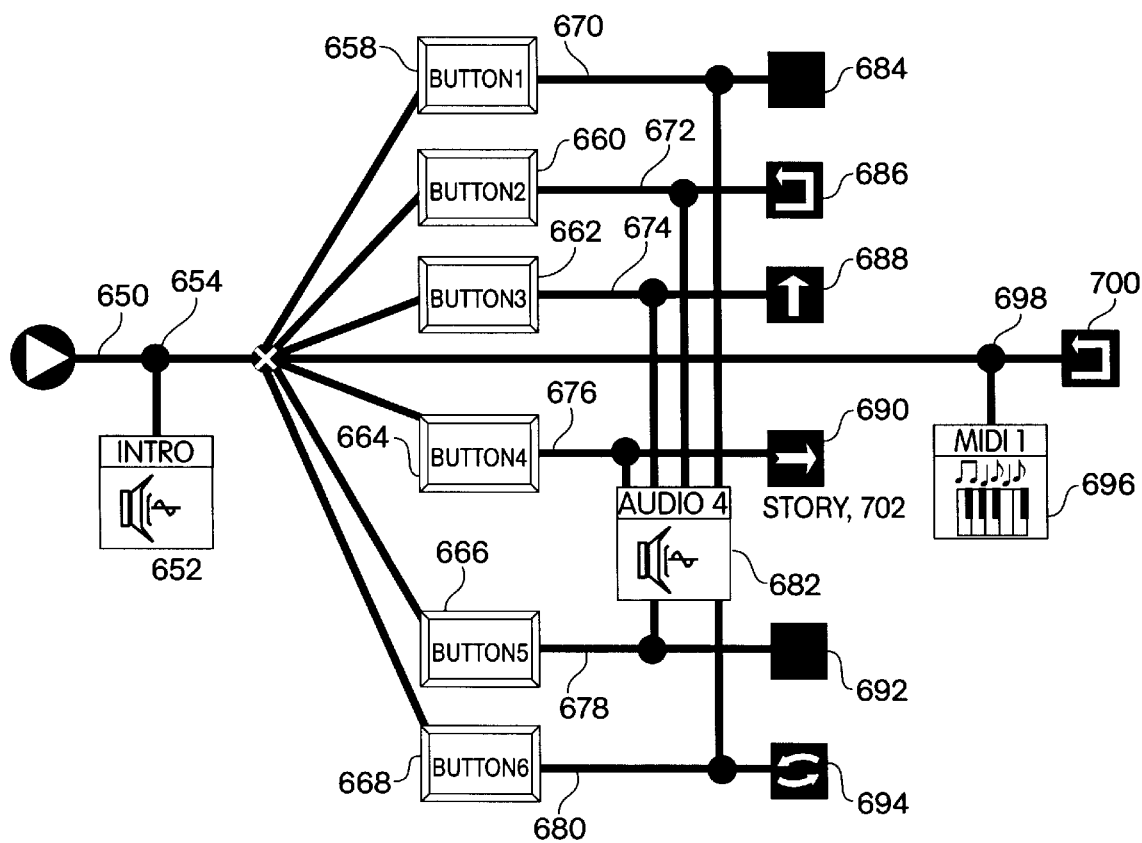

FIG. 23 illustrates the use of button icons and End Spots in a StoryLine.

Figure 24:
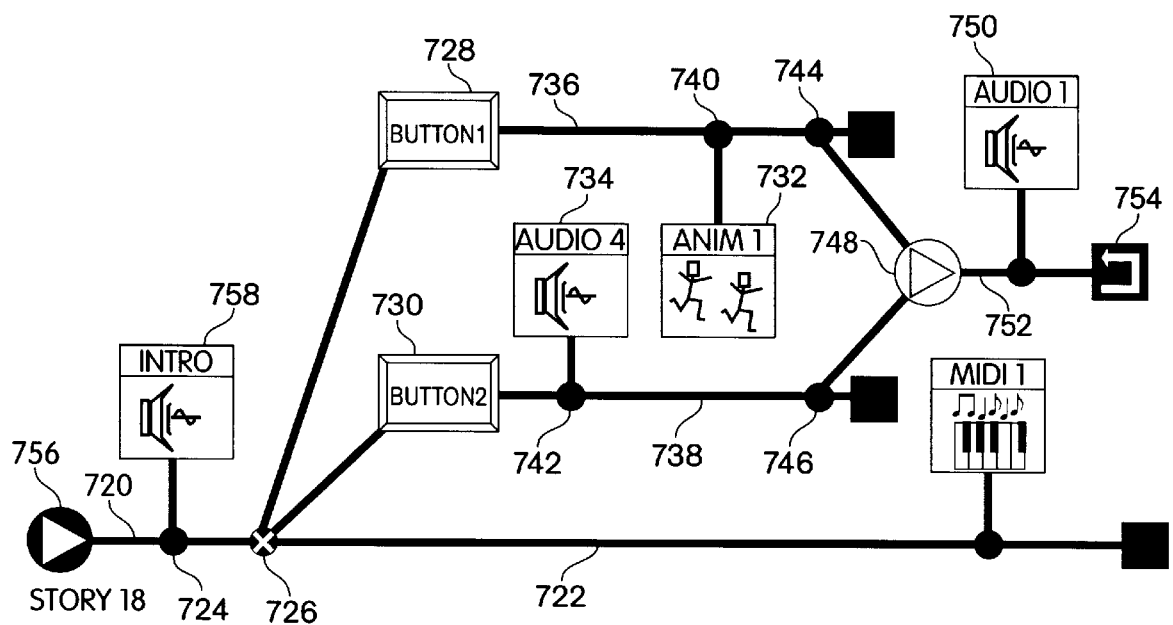

FIG. 24 illustrates the use of a Transparent Start Spot in a StoryLine.

Figure 25A:
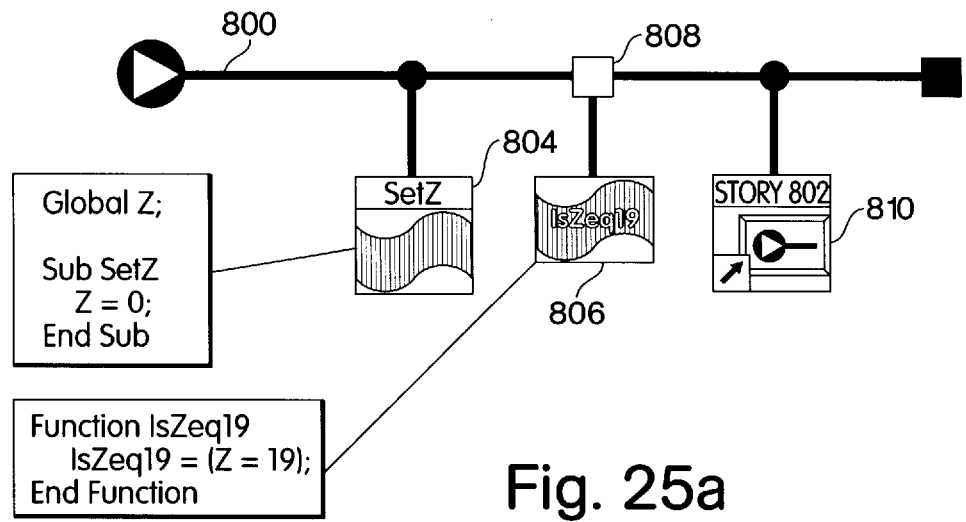
Figure 25B:
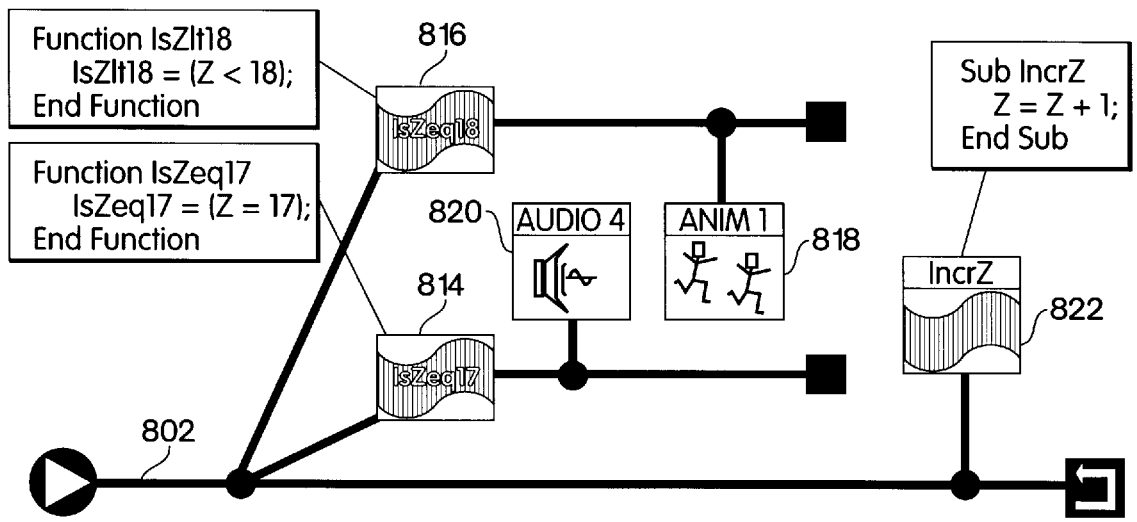

FIGS. 25(a)–(b) illustrate the use of scripting functions in a StoryLine.

Figure 26:
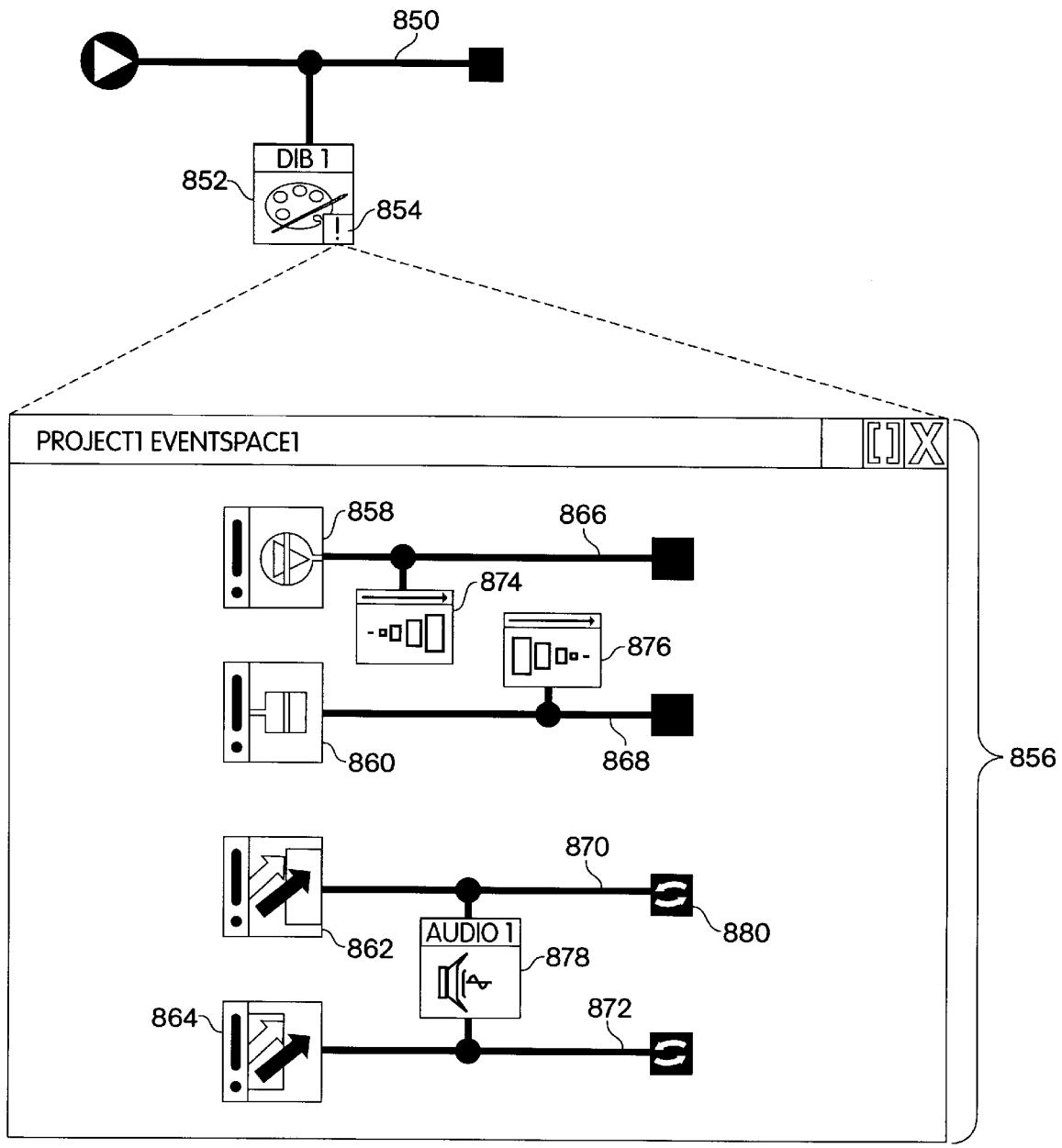

FIG. 26 illustrates the use of an EventSpace in connection with an icon.

Figure 27:
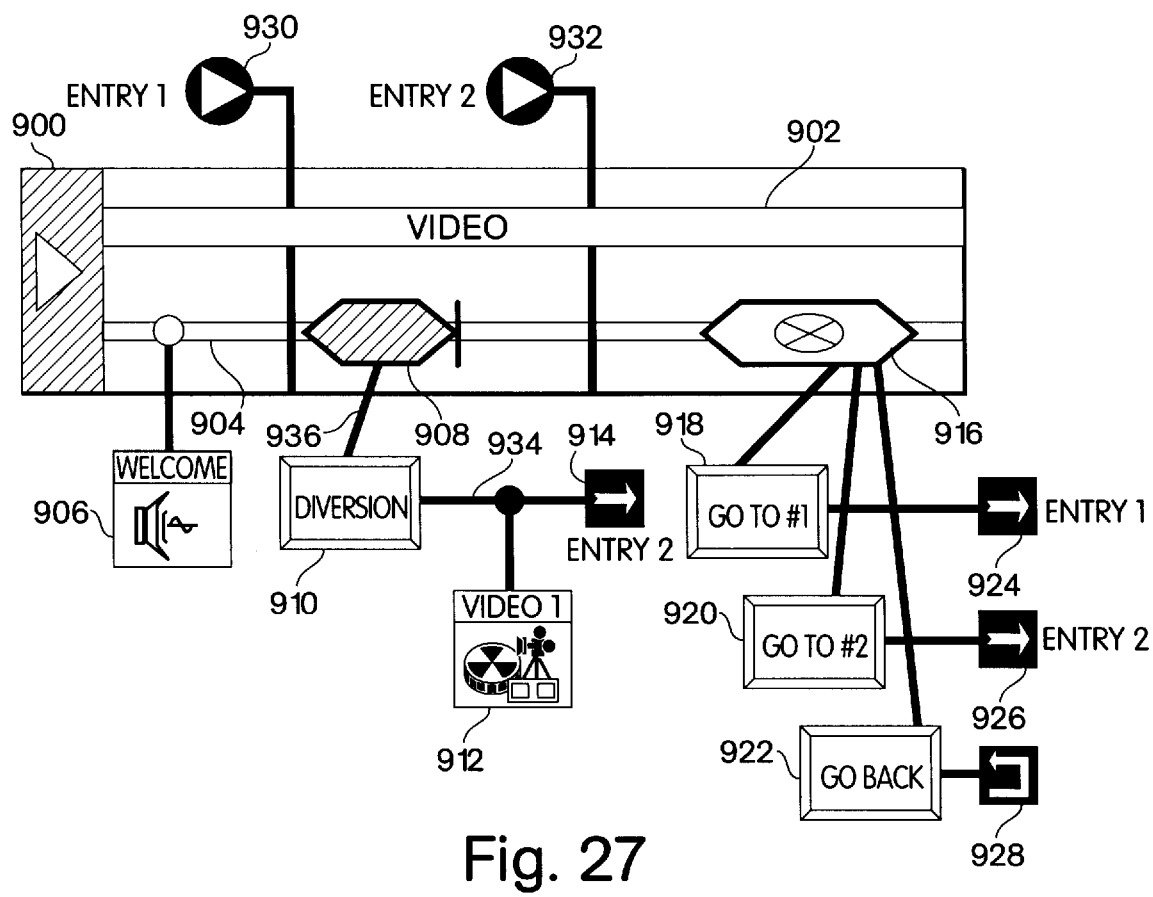

FIG. 27 illustrates the use of a StoryLine called from a TimeLine as well as Activation Regions.

Figure 28:
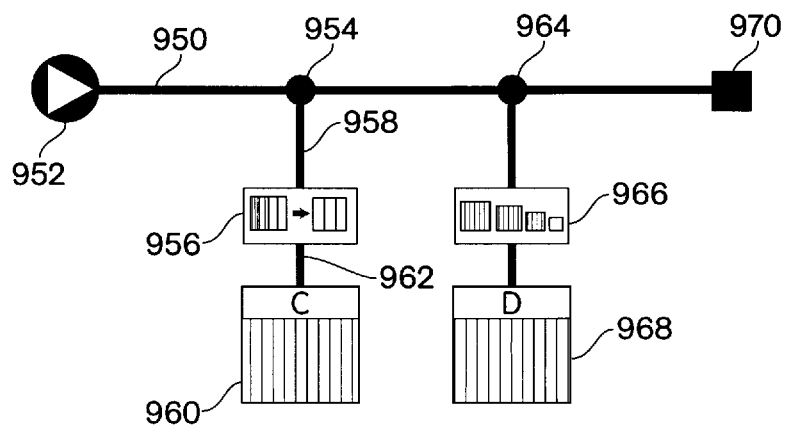

FIG. 28 illustrates the use of Actions in a StoryLine.

DETAILED DESCRIPTION OF THE PREFERRED EMBODIMENTS

Figure 1:
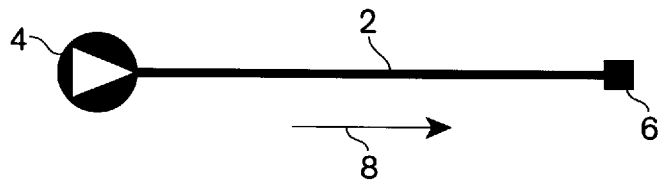

In order to appreciate the operation of the system of the present invention, it is first necessary to understand the meaning and function of certain symbols which may appear on the users computer screen which are created, moved and manipulated by the user in accordance with his or her design of the story. A simple form of a StoryLine is shown in FIG. 1 as having a line 2 which connects a Start Spot 4 with an End Spot 6 in the direction shown by arrow 8. In the "story" illustrated in FIG. 1, there are no video clips or other objects to be played but nevertheless the figure illustrates the direction and operation from the Start Spot to the End Spot. The unidirectional connection line 2 between the Start Spot and the End Spot is called the Path Line and is a basis for forming a StoryLine in the present invention. The Start and End Spots disclosed above may be provided with the program as acquired by the user. Thus, in assembling a StoryLine, the user, by techniques well known to computer programming in a Windows or Macintosh environment, can select, with a mouse or other cursor pointing device from a library, which may be located in any portion of the viewer's computer screen, the symbols for Start, End, etc. as well as the Path Line symbol and begin creating a story by the well known pick-up and drag function. While other predetermined and prepackaged symbols or icons will be described, it is important to note at this juncture that the task now remains for the user to construct subject matter icons for use in authoring a StoryLine.

Figure 2A:
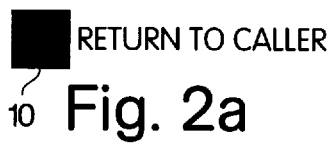

The program user is provided with a number of predetermined symbols and icons which are useful for to create, assemble, compose and play a story. Techniques by which symbolic materials, representations, graphical materials and icons may be created and stored and presented for use by the user in a Windows or Macintosh environment is well known to those skilled in the art. FIGS. 2(a) through 2(f), for example, illustrate six common End Spots which represent the ends of stories and sub-stories. For example, FIG. 2(a) represents a Return to Caller Spot 10 which indicates the finish of playing the current StoryLine and halts all further activity, but only on the StoryLine to which it relates, and then returns to its caller, if any, which may be another StoryLine. If there was no caller, reaching a Return to Caller End Spot halts play and returns control to the author/user of the story.

Figure 2B:
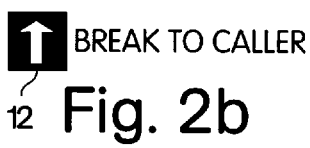

FIG. 2(b) illustrates one form of a Break to Caller End Spot 12, the operation of which is detailed in the discussion of FIG. 23 below. FIG. 2(c) illustrates one form of a Go-Back to Start Spot 14 and FIG. 2(d) illustrates one form of a Go-To Linked StoryLine, TimeLine or Sequence Spot 16. Break and Go-Back spots consider the nearest calling StoryLine, TimeLine (explained below) or Sequence (also explained below) Start Spot to be significant for purposes of determining the behavior of the end spot. The Spots illustrated in FIGS. 2(b) through (d) cause the calling StoryLine or TimeLine to terminate before taking the indicated action symbolized by each of their respective forms.

Figure 2E:
Figure 2C:
Figure 2F:
Figure 2D:
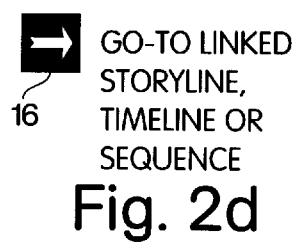

FIG. 2(e) represents one form of a Halt Player End Spot 18, which will, as its name indicates, halt any further play of all active StoryLines, TimeLines and Sequences and return control to the author/user. FIG. 2(f) represents one form of a Recycle End Spot 20 which will, as its name indicates, rearm the nearest Button, Function, or Event Handler to which this type of end spot is associated. The operation of each of these types of End Spots is discussed below in connection with the operation of the StoryLine of FIG. 23. The particular symbols illustrated in FIGS. 2(a) through 2(f) for the described function are for illustration purposes only, and thus other symbols may be utilized as desired by the user.

Figure 3:
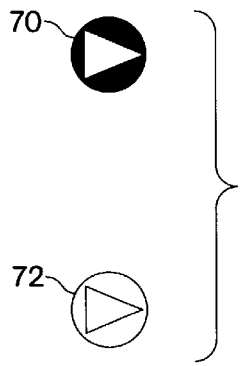

FIG. 3 illustrates the form 70 of a Start Spot used with FIG. 1. FIG. 3 also illustrates another type of Start Spot. In FIG. 3, a Start Spot 70 is one form of a "regular" start spot and denotes the beginning of a StoryLine. Start Spot 72 is a so-called Transparent Start Spot, and indicates the beginning of a Transparent StoryLine. The Transparent form of a Start Spot is not considered a Start Spot by Go-Back, Recycle, Go-To and Break End Spots, as will be illustrated below.

Figure 4A:
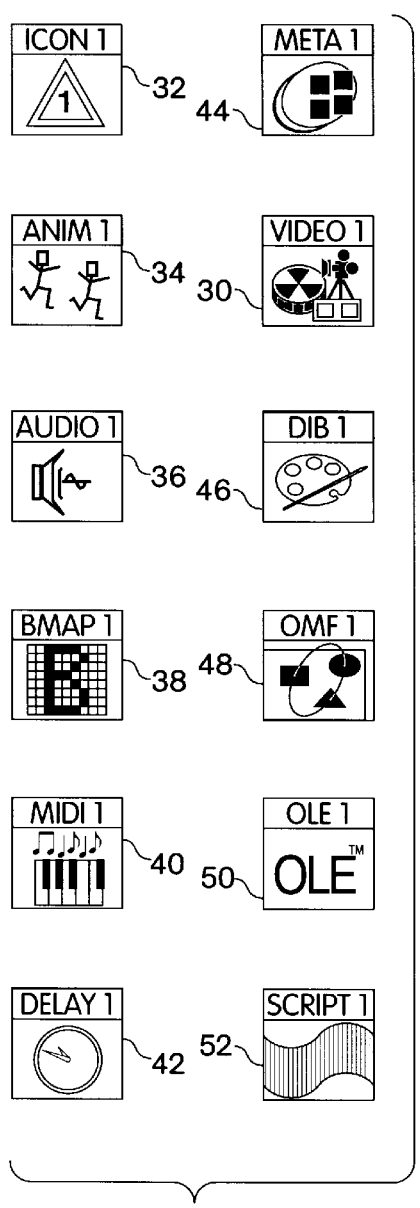

FIGS. 4(a) through (d) illustrate various forms of icons which can be associated with a StoryLine. FIG. 4(a) shows one type of a Media Icon 30 which contains a single frame from a video sequence being displayed to represent the particular video sequence contained in the media file associated with the icon 30. The icon 30 is, of course, linked to a media file contained in a Project File (explained below) or a file supported by the operating systems in the user's computer system. The media file may also be remotely located, it being desirable in each case that the files and their storage medium be of sufficient speed of file access so that a smooth transition from the playing of one media file to another occurs. The techniques of associating icons with given data sets or media files are well known in the art and, thus, in themselves are not an aspect of the present invention.

Other types of icons related to that shown in FIG. 4(a) are useful as well in multimedia construction and presentation. These are illustrated in FIGS. 4(a) as well. Icon 32 represents an "empty" icon which will have one or more identifying labels illustrated on its empty "face", such as the video illustrated in icon 30. Icons 34 through 52 represent other types of labels which indicate to the author/user the content of that particular icon. These may include: animation (34); an audio sequence (36); a bitmap image (38); a MIDI music sequence (40); a delay (No-Operation) (42): a Metafile (42); a device independent bitmap (as in Microsoft's Windows Operating System Environment) (46); an OMF (Avid Technology's Open Media Framework) media sequence (48); an OLE (Microsoft's Object Linking and Embedding) object (50) or a Call to a Script Subroutine (52). Icons can be thought of as the paragraphs and sentences of a StoryLine, objects which give the StoryLine its meaning.

Figure 4B:
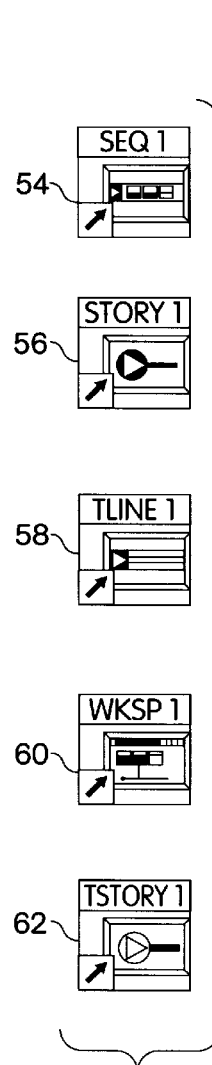

In addition to icons which represent pieces of media or other material, icons can be used to link to other SVL objects. These are illustrated in FIG. 4(b). Icon 54 represents a link to a Sequence, the arrow or other so-called adornment 55 being a visible indicator of a link to another object. A link to a StoryLine (56) is shown, as are links to a TimeLine (58), a WorkSpace (60) or to a Transparent Start Spot (62). In each instance of icons 54 through 62, the object or sequence linked to is "outside" the StoryLine and may even be another StoryLine, as in icon 56.

Figure 4C:
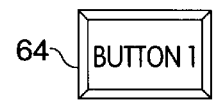

Yet another form of Icon is called a Triggerable Icon, illustrated as Icon 64 in FIG. 4(c). Icon 64 is called a Button Icon. As its name suggests, a button icon is something which may be pressed, in the computer system by, for example, placing a mouse or other pointing device on or near the button and clicking on it in a fashion well known in the art.

The icon 64 is an interactive button icon and allows a user to play or activate a particular branch of a StoryLine which may contain a media icon such as media icon 30 in FIG. 4(a). The button icon allows the user, by clicking on the button, to activate some multimedia activity represented by a media icon contained in a Path Line called a "tail" illustrated below which is associated with the button.

Figure 4D:
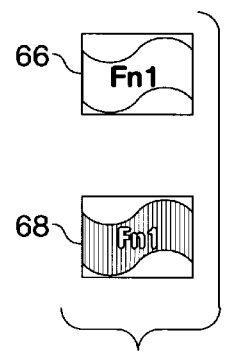

FIG. 4(d) illustrates the form of two additional icons, 66 and 68, which are script related. Somewhat like a button icon, each of these trigger some event when the function called (the "Fn1" illustrated in FIG. 4(d)) returns a certain value. The script function may be invoked one time (Icon 66) or continuously (Icon 68). The operation of a script related icon will be given below.

So far, there has been described the use of icons to "give life" to the form of a StoryLine illustrated in FIG. 1. There must be some means to interconnect the icons to the Path Line which flows from the Start Spot to the End Spot. This functionality is provided through the use of Call Spots, to be presently described.

Figure 5:
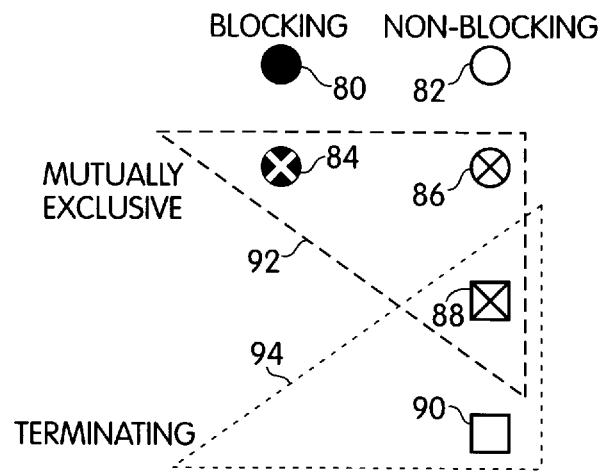

FIG. 5 illustrates six types of Call Spots 80 to 90. As illustrated in FIG. 5, Call Spots are of two general types, blocking (80 and 84) and non-blocking (82, 86, 88 and 90). By blocking is meant that the StoryLine waits for all the objects called from the blocking spot via Call Lines to finish playing before carrying on to the next Call Spot along the Path Line. By Non-Blocking is meant that the objects called from this type of Call Spot will begin operation or play, but then almost immediately thereafter the next Call Spot on the Path Line will be played.

In addition to being Blocking or Non-Blocking, Call Spots may have the attributes of being either terminating or mutually exclusive as illustrated by the dotted line matrix lines 92 and 94 in FIG. 5. Mutual Exclusive means that when the first called object associated with an icon activates (such as a button being pressed or an object finishes playing), all other parallel-called objects are disabled or terminated. Terminating means that the StoryLine (or TimeLine) which the Call Spot is connected to is terminated when the called objects finish their play. Illustrations of the operation of each of the Call Spots 80 through 90 is given below to aid in the understanding of the function of the Call Spots.

Figure 6:
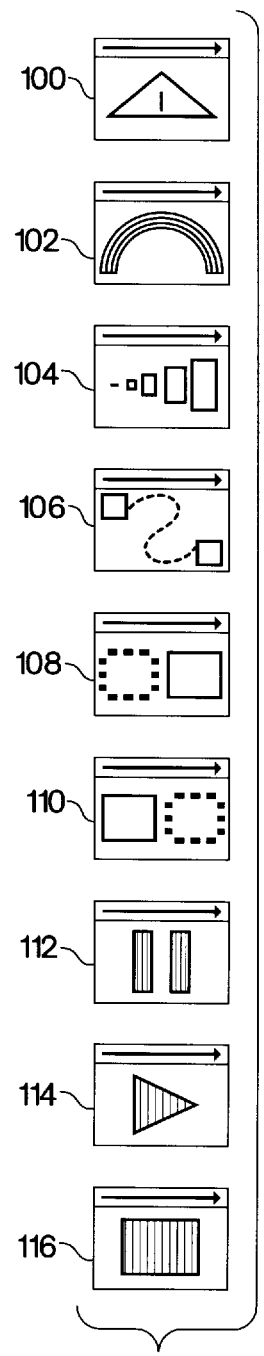

FIG. 6 illustrates the form of a number of Actions. An Action is an icon which denotes the sending of a particular set of instructions or a message to all SVL Objects or icons connected to it through Action Lines. Actions affect the currently playing connected objects and may affect the visible representations or play of those objects. The generic form of an Action is shown by icon 100. This icon can be "filled" with a number of different functions acting on the object being called, such as ordering the media being played to change color (102), change its size (104), become animated (106), fade in (108), fade out (110), pause the play (112), resume play (114), and terminate (116). It should be understood that a number of other functions may be provided for that are known to those skilled in the art.

Figure 7A:
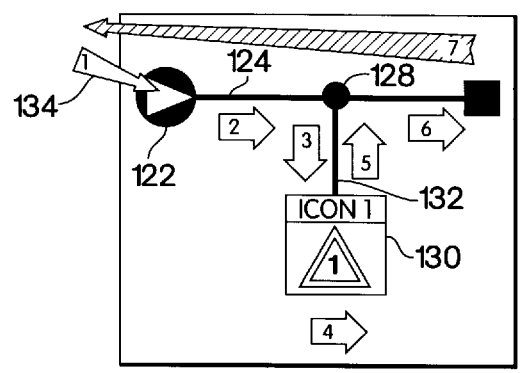

Turning now to FIGS. 7(a) and (b), these figures illustrate the operation and playing of simple StoryLines, incorporating the information on Start Spots, Path Lines, End Spots, Call Spots, Icons and Actions. FIG. 7(a) illustrates the operation of a simple story. The StoryLine 120 contains a Start Spot 122, a Path Line 124, an End Spot 126, a Call Spot 128, an Icon 130 to be played and what is called a Call Line which connects the Call Spot to the Icon 130. Path Lines do not have delay associated with them. Thus, the time to play the StoryLine of FIG. 1 would be zero time. Call Lines represent a diversion from the unidirectional flow of the play of a StoryLine. In the StoryLine of FIG. 7(a), the StoryLine is called by some means to the Start Spot 122. The first segment of the Path Line connecting Spot 122 and Spot 128 is played in zero time, and the Blocking Call Spot is reached in the play. As mentioned, the Blocking Call Spot will block the playing of the remainder of the StoryLine until all the objects connected to the Call Spot through the Call Line finish playing. Thus, the "action of the story" will travel down Call Line 132 to Icon 130, it will finish playing, the flow of the story returning to the Call Spot as indicated by the flow of arrows. The remainder of the story will play to the End Spot 126 to completion.

Figure 7B:
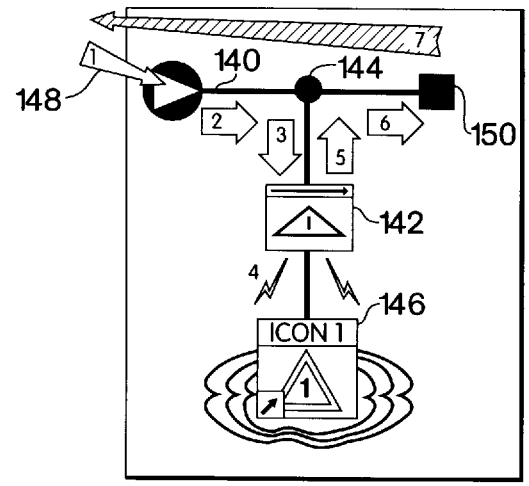

FIG. 7(b) is similar to the StoryLine of FIG. 7(b), except that in the StoryLine 140 illustrated in FIG. 7(b), an Action 142 is interposed between the Call Spot 144 and the Icon 146. The play of the StoryLine 140 will proceed as described with respect to FIG. 7(a), except that when the Call Spot 144 is reached, the Action 142 will perform whatever action is indicated (such as those illustrated in FIG. 6) on the media or other object associated with the Icon 146, before the flow of the StoryLine returns, as seen by the flow of arrows 148 back to the Call Spot 144 and the End Spot 150.

In the use of Icons, each of these icons is linked to a file containing media, embedded objects or links to objects and can be of any supported data type, that is, images, audio data, video data or textual data. These objects may be, for example, video clips of a defined content and duration contained in a computer-readable format which may be created and edited using a non-linear video editing system, such as the Media Composer available from the assignee of the present invention.

The StoryLine provides a easily-understood graphical representation which at a glance gives the user knowledge of the sequence of events which take place in the StoryLine. In addition, in assembling the media icons, the computer-format media corresponding to each of the icons are also linked to one another, so that there is a linking of the media underlying the icons, using techniques well known to those skilled in the art, so that the media will play in the order and manner illustrated in the StoryLine. The linking allows the user to additionally play the sequence of media events in the StoryLine to determine whether the user is satisfied with the assemblage of media represented by media icons. If not, the user can modify the StoryLine, by adding or deleting media events.

If satisfied with the graphical arrangement represented by the StoryLine, the user may choose to play the StoryLine to see if he or she is satisfied with the actual presentation. In the story shown in FIG. 7(a), once the user has clicked on the start spot 122 with a mouse or other cursor device, the first object, whether it is textual, video or audio corresponding to icon 130 will be played.

Upon completion of the play of object 130, the StoryLine will reach the End Spot 10 and playing of the StoryLine is terminated, but not necessarily terminating all activity in all playing stories. Of course, upon clicking on the Start Spot, the computer programmed in accordance with the present invention will fetch the media files corresponding to icon 130 from the computer's memory and cause them to be sequentially played.

Figure 8:
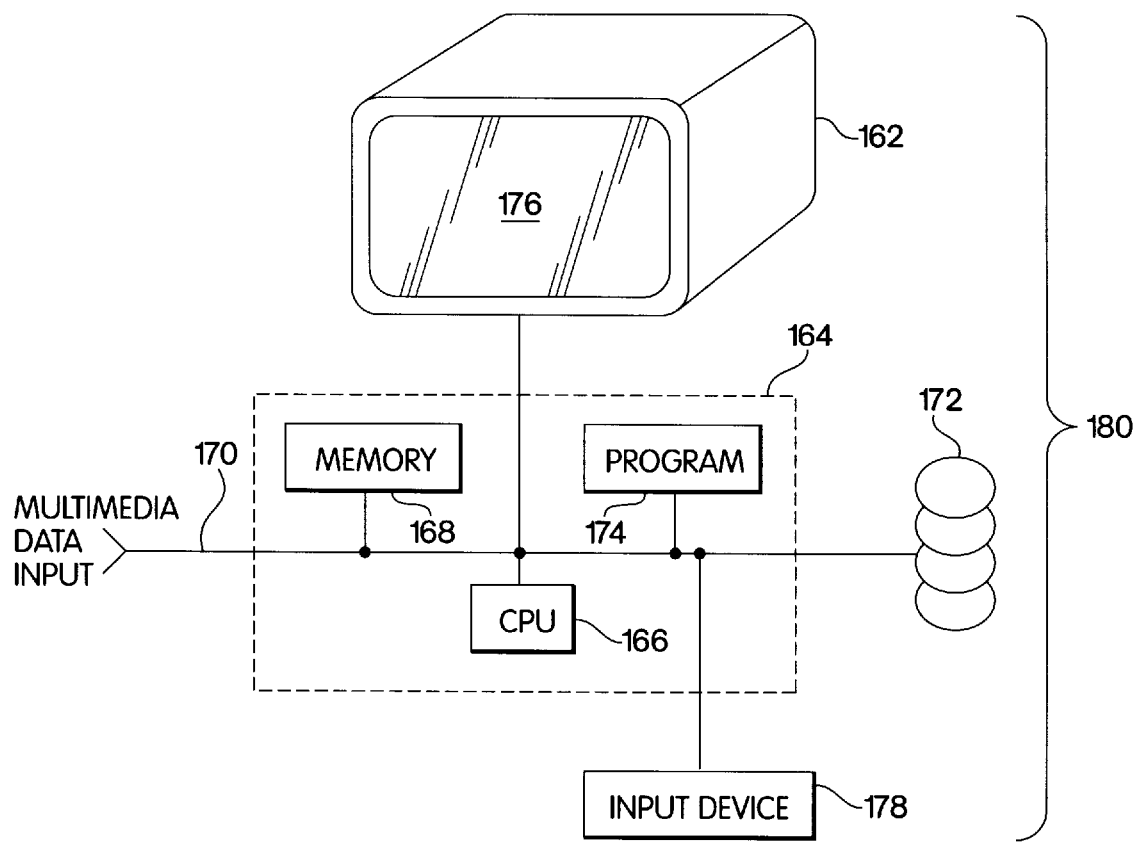
FIG. 8 illustrates a computer system which may be used in conjunction with and implementing the present invention.

FIG. 8 illustrates the general form of a computer system 180 which may be used in connection with the present invention. The computer system 180 contains a display device 162 which may be a standard CRT or other type of display. The computer system further includes a hardware module 164 which will contain a microprocessor or CPU 166 which oversees the computing functions of the system, an internal memory 168 which may be of a RAM type, a device 170 for an input of multimedia data, a storage system 172 which can store programs as well as data, a program 174 which may contain the program described in the present invention for interacting with the computer system 164 as well as any other programs desired for handling the media files, such as those in the Media Composer referred to above, and in input device 178 which may be either a keyboard, mouse or other cursor pointing device. The image shown in FIG. 8 may appear on the screen 176 of the display device 162. Thus, the user may manipulate the input device 178 and after having input multimedia data 170, may utilize the program 174 of the present invention to author, compose, edit and run a StoryLine as described in the present application.

Figure 9:
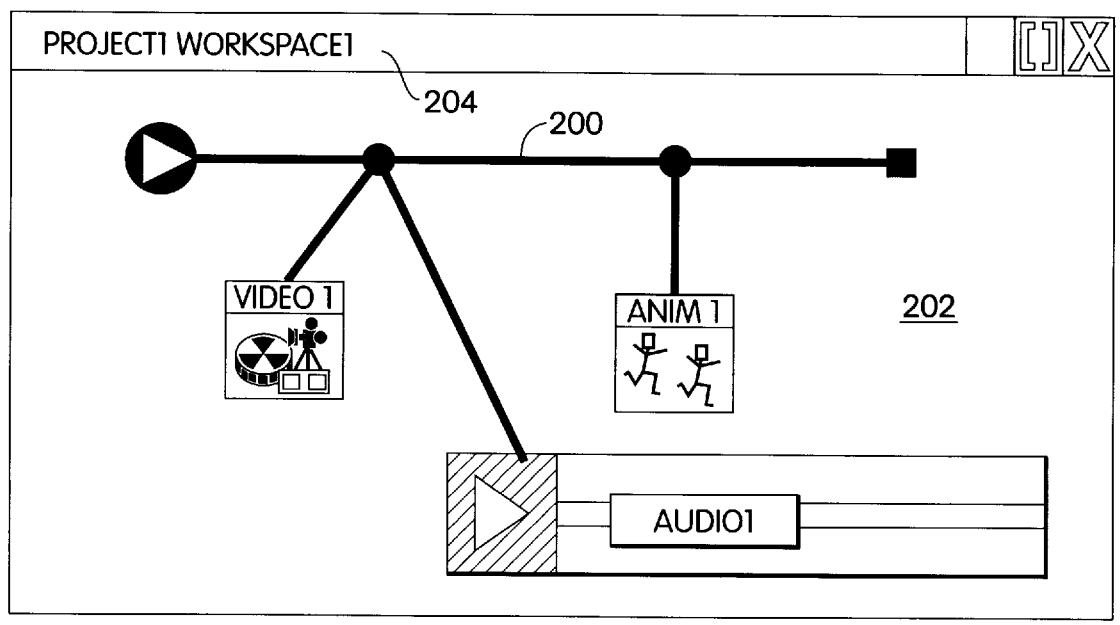
FIG. 9 illustrates a display on the computer system of FIG. 8(b).

FIG. 9 illustrates the form of a display of the type described in this application on the screen 176 of the computer system of FIG. 8. For purposes of illustration, a StoryLine 200 is illustrated as being displayed in WorkSpace 202 on the computer display device. The WorkSpace may have indicia 204 identifying the particular WorkSpace being displayed on the screen 176 of FIG. 8. The indicia 204 refers to Project and a Workspace. A Project is the fundamental unit of storage of collections of SVL objects. The Project contains a set of Workspaces, which represent the user's multimedia story. WorkSpaces are where SVL objects can be arranged into stories.

FIG. 10(a) illustrates the inclusion, in an Icon 210, of a reference point (called an EventSpace Adornment) 212 to what is termed an Eventspace, which is a special container for one or more so-called Event Handlers associated with a particular object linked to an Icon. When the object is active, the Event Handlers in the associated EventSpace are active and are played. The reference 212 to the EventSpace is a symbol, here an exclamation point for the purposes of illustration, to one or more of a number of possible Event Handlers, illustrated in FIG. 10(b) as Event Handlers 214 through 236. Each Event Handler will have associated with it a tail comprising an attached StoryLine, as will be described below. An Event Handler "listens" for a particular Event to occur. When the appropriate Event occurs, its attached StoryLine is played. Event Handlers may have the following "triggers", in addition to a generic empty Event Handler (214) for the author of a story to "fill in": waiting for a right mouse click (216); waiting for a left mouse click (218); waiting for a left mouse double click (220); an Event just prior to the beginning of play (222); receiving focus (224); cursor entering (226); upon receiving a key stroke (228); an Event just after the end of play (230); losing focus (232); cursor leaving (234) and upon a time-out (236). Event Handlers provide a facility for a StoryLine to be activated when, for example a user double clicks a mouse over a particular illustration on the screen or a particular portion of a screen. Other forms and functions for Event Handlers are within the knowledge of those skilled in the art.

FIGS. 11(a) through (c) illustrate what are entitled TimeLines. A TimeLine is similar to a TimeLine in a non-linear computer-based video editor such as the Media Composer product which is available from Avid Technology, Inc. of Tewksbury, Mass. and is described in U.S. Pat. No. 5,355,450. A TimeLine may also be an icon on a StoryLine. A TimeLine is ideal for micro-juxtaposition of media elements with respect to one another. A TimeLine is created by the user or by another to define and determine the length of play of each or selected of the icons which are represented in the StoryLine. TimeLines also allow trimming and stretching of the duration of play of multimedia material represented by an icon.

TimeLines allow careful synchronization of the lifetimes of objects with respect to one another. The length of a TimeLine track and the Icons along it depict the duration of the track and, individually, the durations of the Icons. Any Icon that points to media (items with a defined duration that are not links to StoryLines, TimeLines or Sequences (explained below)) and does not have an EventSpace may be placed in the TimeLine. Links can be made to TimeLines. TimeLines may also be called from StoryLines. TimeLines can also call other objects at a particular time. Any non-blocking Spot may be placed along a track on a TimeLine to call Icons.

FIG. 11(a) illustrates the basic form of a TimeLine 250 which has a Start Point 252, a TimeTrack 254, and a number of Icons (which may be of the type described above) 256 through 266 which are played for the period of time along the TimeTrack they encompass. Thus, in the TimeLine of FIG. 11(a), the media, for example, represented by the Icon 256 will have a shorter duration than that represented by Icon 260. The absence of an Icon overlapping the beginning of TimeTrack 254 indicates that the timing of the beginning and end of play of Icons can be precisely controlled. FIG. 11(b) illustrates that a TimeLine 270 can be made a called object from a StoryLine 272. Furthermore, FIG. 11(c) illustrates the calling of a StoryLine 280 from a TimeLine 282, demonstrating the flexibility of utilizing StoryLines and TimeLines in the production of precisely timed multimedia events.

A further embodiment of the flexibility of TimeLines is illustrated in FIGS. 12(a) and (b) in what are termed Activation Regions. Activation Regions are specialized forms of Call Spots found only in TimeLines. The purpose of an Activation Region is to constrain the lifetime of objects called from the Activation Region to a specific duration and juxtaposition as expressed by the Region's extent on the TimeLine. As with "normal" Call Spots described above, there are a number of different Activation Regions which have different effects on the progress of a TimeLine. These are illustrated in FIG. 11(a) as a matrix of blocking, non-blocking, terminating and mutually exclusive Activation Regions, similar in function to the corresponding Call Spots discussed in connection with FIG. 2 above. For example, a first form 300 allows called objects to exist for the duration of the region and then terminates all called activity when the region's lifetime expires. A second form 302 is a variant of the first form and allows activated button-called objects to continue to play to completion or until the TimeLines ends, whichever occurs first. A third form 304 is also a variation of the first form, and in the event that any button-called objects activates, the TimeLine will pause until the objects complete play. If no button-called object is activated, at the end of the region all called objects are terminated as they would be in the first and second variants. FIG. 12 illustrates a TimeLine 306 containing Activation Regions which are linked to a number of called objects represented by Icons. The operation of an Activation Region in a TimeLines will be given below.

FIGS. 13(a) through (c) illustrate the form and operation of an ordered collection of Icons entitled a Sequence. Sequences, like TimeLines, may be linked to as well as called from StoryLines. Sequences are useful for simple, seriatim presentation of multimedia objects and are easier to move around (since there are no Call Lines or Call Spots). The data structure of a sequence is different from that of a "normal" StoryLine, being simpler and requiring less memory, since there is no need for multiple links to different called objects when multiple Call Spots are used.

FIG. 13(a) illustrates a simple Sequence 320 with a number of Icons representing objects to be called in seriatim from the first Icon 324 to the last 326. FIG. 13(b) is similar, but illustrates a Sequence 328 of a larger number of Icon-represented objects which will be called and played upon activation of the Sequence from the start position 330. FIG. 13(c) illustrates the calling of a Sequence from the Call Spot 334 on the StoryLine 336.

The operation and interaction of the various elements of a StoryLine, TimeLine, Sequence and the behavior of Activation Regions within TimeLines will now be illustrated.

FIG. 14 illustrates a StoryLine 400 with a regular Start Spot 402 and a Return To Caller End Spot 404. In addition, Icons 406, 408 and 410, representing objects, such as media including video and audio material, are linked to the Path Line 412 by Call Lines 414, 416 and 418 to Call Spots 420, 422, 424. Since the Call Spot illustrated is a blocking Call Spot in the playing of the story of FIG. 14, the StoryLine proceeds to play the entirety of the media represented by Icon 406. When that media has finished playing, the StoryLine proceeds to play the material represented by the next Icon, 408. When the media represented by Icon 408 completes play, then the StoryLine will proceed to the last Icon 410. Upon the completion of the material represented by Icon 410, the StoryLine will end and return control to the caller of the StoryLine, whatever that may be.

FIG. 15 represents another StoryLine illustrating the principle that any number of icons may be called from a Call Spot. As in the Story of FIG. 14, each of the Call Spots 430 and 432 associated with StoryLine 434 are blocking-type Call Spots. The Call Spot 430 has associated with it two icons 436 and 438, each of which are connected by their respective Call Lines 440 and 442 to the Call Spot 430. In playing the Story illustrated in FIG. 15, when the blocking Call Spot 430 is reached, the media represented by the Icons 436 and 438 will commence in parallel and continue until the last to expire of two media items completes its play. Upon completion of play, the control will return to the Call Spot 430 and subsequently the media, which is the media 444, connected to Call Spot 432 will be played after which the StoryLine will halt at End Spot 446.

FIG. 16 illustrates one way in which TimeLines, Sequences and other StoryLines can be called directly from a StoryLine. In FIG. 16 a main StoryLine 450 has, along its Path Line 452, Call Spots 454, 456 and 458. Call Spot 454's Call Line 460 has associated with it a Sequence 462. Call Spot 456 has associated with it another Story 464 and Call Spot 458 has associated with it, a TimeLine 468. In the playing of the StoryLine 450 of FIG. 16, the playing will first stop at blocking Call Spot 454 and play the sequence of icons illustrated in FIG. 16 as two icons 470 and 472 in seriodium with no delay. After the completion of play of the sequence 462 the play will continue to the second Call Spot 456. Call Spot 456 will call a StoryLine 464 which has associated with it two icons 474 and 476, each of which is connected to the Story 464 by blocking Call Spots. Thus, the media represented by icons 474 and 476 will completely finish their play before returning control back to Story 450. The StoryLine will then progress to Call Spot 458 which calls TimeLine 468. TimeLine 468 has two icons associated with it, icons 480 and 482. Each of the media represented by those icons will play in accordance with the time allotted to them along the TimeLine, at the end of which control will return to Call Spot 458 and the Story will end with the Return To Caller End Spot 484.

FIG. 17 illustrates the ability of more than one StoryLine to share a icon simply by calling them as desired in what are called "Alternative StoryLines". FIG. 17 illustrates two stories, Story 500 and Story 502. These are shown next to each other, and each of the stories has icons 504 and 506 associated only with one of the StoryLines. Icons 508 and 510, however, are connected to both of the StoryLines through Call Spots 512 and 514 for icon 508 and Call Spots 516 and 518 for icon 510. The purpose of Alternative StoryLines are to allow the author to compose more than one variation of the same story. Only particularly relevant media need be included in the Alternative Stories.

When Story 500 is played, flow of the StoryLine will proceed from the media represented by icon 508 then to icon 504 and finally to icon 510, before ending at End Spot 520. In the play of Story 502, first the media represented by icon 508 will be played, followed by that of icon 506, followed by that of icon 510 whereupon the StoryLine will end at the End Spot 522. Stories 500 and 502 can even be active simultaneously. In this case, it is possible that more than one copy of icon 508 and icon 510 could be played at the same, or overlapping, times.

FIG. 18 illustrates the use of non-blocking Call Spots. FIG. 18 illustrates a Story 530 having two non-blocking Call Spots, Call Spots 532 and 534 along the Path Line 536. Each of these non-blocking Call Spots has associated with it either some background image 538 or background music 540. In addition, a blocking Call Spot 542 attached to an animation 544 is connected on the Path Line after the two non-blocking Call Spots 532 and 534. Since both 532 and 534 are non-blocking when the StoryLine 530 is played, a background 538 will appear on the screen while the background music plays while an animation 544 also plays. The background image 538 and music 540 will halt either when: (1) their individual duration expires (if definite) or (2) the StoryLine ends. The completion of the animation in icon 544 will cause the playing of End Spot 546, which will kill all activity associated with Story 530 and thus the activity of the non-blocking Call Spots 532 and 534.

FIG. 19 represents a StoryLine which illustrates two matters, the use of button icons and StoryLines and the effect of using blocking versus a mutually exclusive blocking Call Spot when buttons are also used. FIG. 19 includes a Story 550 which has a Path Line 552 with a blocking Call Spot 554 and a mutually exclusive blocking Call Spot 556 along the Path Line. In addition, buttons 558 and 560 are connected to the Call Spots 554 and buttons 562 and 564 are connected to Call Spot 556. In the playing of Story 550, the StoryLine will not continue beyond blocking Call Spot 554 until both button 558 and button 560 are triggered and their respective icons 568, and 566 and 568, are played. Assuming that this task has been accomplished, the StoryLine will then proceed to the mutually exclusive blocking Call Spot 556. In this case, the triggering of either of button 562 or 564 connected to Call Spot 556 will disable all other objects called from Call Spot 556. As in the previous case, the triggering of one of the buttons will cause its tail 570 or 572 to play. The difference from the previous case is that the StoryLine is allowed to continue rather than having to wait for all of the buttons to be pressed as in the case of the blocking Call Spot 554.

FIG. 20 illustrates a StoryLine which contains a non-blocking Call Spot and a terminating non-blocking Call Spot. In the playing of Story 580 contains a non-blocking Call Spot 582 and a terminating non-blocking Call Spot 584 along its Path Line 586. Call Spot 582 has associated with it icon 588 and Call Spot 584 has associated with it a button 590 having a tail 592 and an audio icon 594. In addition, a blocking Call Spot 596 has associated with it some music 598 in the example illustrated in FIG. 20. When StoryLine 580 is played, the background 588 will be put up for the length of StoryLine, a button 590 will appear at an author-selected location and the music 598 will start to play. If the music finishes, the End Spot 600 is reached and the StoryLine ends. However, if the button 590 is pressed by the viewer before the music 598 finishes, the sound 594 is played and then the StoryLine is terminated, returning control to the caller of Story 580. If there is no caller of Story 580, playing will halt completely.

FIG. 21 illustrates yet another StoryLine 602 which contains a non-blocking, mutually exclusive Call Spot 604 which has associated with it icon 606, containing background music and icon 608, containing a link to another StoryLine named "Story 42". In addition, a blocking Call Spot 610 is connected to another icon 612. When the Story 602 of FIG. 21 is played, when either icon 606 finishes playing or "Story 42" of icon 608 terminates, all activity along StoryLine 602 terminates. If, however, the media material represented of icon 612 terminates before either of the media represented by icon 606 or 608, all activity along the StoryLine will terminate.

FIG. 22 represents a StoryLine 620 having a blocking Call Spot 623 and a mutually exclusive non-blocking, non-terminating Call Spot 622. Call Spot 622 has connected in parallel to it, a video icon 624 and an audio icon 626 where as blocking Call Spot 622 has connected to it some background music 630. When playing the StoryLine 620, the video icon 624 and the audio represented by icon 626 will play together as will the background music 630. When either the icon 624 or 626 finishes, the other terminates but not the material represented by icon 630 which will play to its completion before reaching End Spot 632. If the material represented by icon 630 completes its play prior to either of the materials in icon 624 or 626, play ends and the StoryLine stops at End Spot 632.

FIG. 23 represents the use of all six End Spots illustrated in FIGS. 2(a)–(f), discussed above. Story 650 has an intro piece of audio 652 connected to a blocking Call Spot 654. A mutually exclusive blocking Call Spot 656 follows the blocking Call Spot 654. Mutually exclusive blocking Call Spot 656 has connected to it six buttons in parallel, buttons 658, 660, 662, 664, 666 and 668. Each of the buttons tails 670, 672, 674, 676, 678 and 680 is connected to an audio icon 682. Furthermore, button 658 has a Return To Caller End Spot 684 at the end of its tail. Button 660 has a Go-Back End Spot 686 at the end of its tail. Button 662 has a Break To Caller End Spot 688 attached to its tail. Button 664 has a Go-To Link End Spot 690 attached to its tail. Button 666 has a Player Halt End Spot 692 attached to its tail. Button 668 has a recycle End Spot 694 attached to its tail. Finally, a piece of music 696 is linked to blocking Call Spot 698 followed by a Go-Back End Spot 700.

When Story 650 is played, an introductory sound 652 is played and six buttons 658, 660, 662, 664, 666 and 668 will appear on the user's screen waiting for the user to press one of them. Because these buttons are being called with a blocking mutually exclusive Call Spot, further play on the StoryLine will block until one of the buttons is triggered. The pressing of one button will disable all other buttons that were launched in parallel. When any of the buttons is triggered, the sound represented by icon 682 will play.

What actually occurs after the tail plays depends upon the particular End Spot on the tail of the triggered button. If button 658 is activated, the remainder of the Story 650 is played (the music 696), then the Story 650 repeats itself due to the Go-Back Spot 700 at the end of the StoryLine. The Go-Back Spot 700 terminates all activity on the nearest calling non-transparent StoryLine, TimeLine or Sequence, in this case Story 650 and will start to play on the nearest calling, non-transparent StoryLine, TimeLine or Sequence which, in this case again, is Story 650. If button 660 is pressed, when its Go-Back Spot 686 is reached, all activities on the nearest calling non-transparent StoryLine, TimeLine or Sequence is terminated and play is restarted at that point. The music represented by the icon 696 will not be played when button 660 is pressed. If button 662 is pressed and the Break Spot 688 is played, the nearest calling non-transparent StoryLine, TimeLine or Sequence (Story 650) is terminated and control returns to the caller of that StoryLine.

If button 664 is pressed, when its Go-To Spot 690 is reached, the nearest calling, non-transparent StoryLine, TimeLine or Sequence (Story 650) is terminated and play resumes on the target StoryLine, in this case, Story 702, as indicated by the label next to the Go-To Spot 690. If button 666 is pressed and the Halt-Player Spot 692 is reached, all play halts. Finally, if button 668 is pressed and the Recycle Spot 694 is reached, button 668 is rearmed and appears once again, waiting for a user to press button 668.

FIG. 24 demonstrates the use of a Transparent Start Spot in combination with a regular Start Spot. In FIG. 24 a Story 720 contains along its Path Line 722 three Call Spots: blocking Call Spots 724 and 758 as well as a mutually exclusive blocking Call Spot 726 following the Call Spot 724. Mutually exclusive blocking Call Spot 726 has two buttons 728 and 730 in parallel connected to it. Button 728 has a piece of animation 732 associated with it and button 730 has a piece of audio 734 associated with it, connected to their respective tails 736 and 738 by blocking Call Spots 740 and 742. Following blocking Call Spot 740 and 742 are two other blocking Call Spots 744 and 746 which are connected to a Transparent Start Spot 748 which has a piece of audio 750 connected to its Path Line 752, which in turn ends with a Go-Back End Spot 754.

In the playing of Story 720, first an intro piece of audio material 758 will play to completion followed by appearance of buttons 728 and 730. Then either buttons 728 or 730 is pressed, either the animation 732 or the audio 734 will play followed by a call to Transparent Start Spot 748. This will then play audio portion 750. At the completion of playing the audio material connected with icon 750, the Go-Back spot 754 will go back to the Start Spot 756 of Story 720. The only difference between a Transparent Start Spot and a regular Start Spot is that Go-Back, Go-To and Break End Spots do not affect the StoryLine connected to the Transparent Start Spot (a "Transparent StoryLine") but to the nearest calling non-transparent StoryLine, TimeLine or Sequence wherever that may be, which in this case is StoryLine 720.

FIG. 25 illustrates the use of Script and Function Icons which are illustrated in FIG. 4(d) and discussed above. FIG. 25(a) has a Story 800 and 25(b) a Story 802 which demonstrate the use of scripting and function icons. When played, Story 880 calls the Script represented by Icon 804, "SetZ" which declares the global variable "Z" and sets its value to "0". The Story goes on to set up a Continuous Evaluation Function represented by icon 806 (connected to the script function "Is Z eq 19") via a non-blocking Terminate Call Spot 808. The Call Spot 808 allows the rest of Story 800 to play while the Continuous Evaluation Function operates. When and if this function returns "True", Story 800 and all the activity spawned from it will terminate.

Story 802 shown in icon 810 is called from Story 800 after the Script 804 is run and the Continuous Evaluation Function 806 is set up. Story 802 is a loop which uses Single Evaluation Function calls to script functions "Is Z eq 17" 814 and "Is Z lt 18" 816 and a call to a Script 822. A Single Evaluation Function means that the script function is evaluated once—either it returns "True" (in which case the tail of the function plays) or it fails. It is not constantly monitored as in the case of the continuous variation of function illustrated in connection with StoryLine 800. In the Story illustrated in the StoryLine 802, a simple counter is formed that counts from 0 to 19. If the counter is less than 18 then an animation associated with icon 818 plays, when the count is equal to 17 a sound with icon 820 is also played. Because, at the count of 17, both "Is Z eq 17" and "Is Z lt 18" return True, both the animation and the sound play together for this count of the counter. Each pass around the loop in Story 802, the script "IncrZ" associated with icon 822 adds 1 to the variable "Z". When the count reaches 19, the function "Is Z eq 19" returns "True" causing the Continuous Evaluation Function 806 to actiavte and cause Story 800 and subsequently Story 802 to be terminated. Story flow then passes back to the caller of Story 800.

FIG. 26 represents the use of an icon which contains an EventSpace. As shown in FIG. 26, a StoryLine 850 has associated with it an Icon 852 that has an EventSpace Adornment 854 signifying that an associated EventSpace 856 is present EventSpace 856 contains a number of Event handlers 858, 860, 862 and 864, Each of the Event Handlers has a tail 866, 868, 870 and 872 attached to the respective Event Handlers. Each of the Event Handlers, which are of different types, has at least one icon associated therewith. Icon 874 is an icon representing growth of an image, Icon 876 represents the shrinking of an image and Icon 878 is an audio icon which is connected to both tails 870 and 872.

In the playing of StoryLine 850, when the icon 852 is played, the EventSpace 856 will be activated before the icon is actually played. Because the "Before Play" Event Handler 858 is present in the EventSpace, its tail is played just before media associated with the Icon 852 is played, causing the plane visual representation of the media of Icon 852, in this case an image to grow to full size via the Action 874. Actions that have no Action Lines connected to them in an EventSpace connect to the Icon that owns the EventSpace by default. The second Event Handler is for the "finished play" event. When the icon has finished playing, Action 876 is performed to shrink the image from full size until it disappears. A third Event Handler is a mouse handling Event Handler 862. It is activated when the viewer moves the mouse cursor inside of a visible representation of the icon. This Event Handler 862 only activates when the mouse actually enters the representation. The tail 870 of this Event Handler in this case plays a sound represented by audio icon 878. Because of the recycle End Spot 880 on the tail 870, the Event Handler 862 rearms itself over and over again along as 852 continues to play. Finally, Event Handler 864 is the "mouse leaving" Event Handler. It also plays the sound represented by audio icon 878 and also recycles itself, Thus, when the icon begins to play, its visible representation grows to full size. While it plays if a mouse enters or leaves the playing representation a sound is played. When the icon finishes playing, its visible representation shrinks.

FIG. 27 represents a TimeLine 900. TimeLine 900 contains a video icon 902 that represents a video which is played in parallel with a TimeTrack 904. TimeTrack 904 calls an icon 906 via a non-blocking Call Spot somewhat at the beginning of the TimeLine. Somewhat further down the TimeTrack 904, an Activation Region 908 calls a Button 910 via Call Line 936. The tail of Button 910 calls a video icon 912 and then has a Go-To Link End Spot 914. Further on, another Activation Region 916 contains three Buttons 918, 920 and 922 which are respectively connected to Go-To End Spot 924 (directed to "Entry1" 930), Go-To End Spot 926 (directed to "Entry2" 932) and Go-Back End Spot 928. "Entry1" is illustrated by Start Spot 930 and "Entry2" by Start Spot 932. In the playing of the TimeLine 900, the video 902 begins to play. Shortly thereafter, a sound, such as the "Welcome" illustrated by Icon 906, is played in parallel. After that, a possibly blocking terminating Activation Region 908 displays a button 910 that, if pressed before the Activation Region 908 ends, will cause the TimeLine to pause and the video represented by video icon 912 to play and then the Go-To Spot 914 at the end of the tail 934 is reached, the TimeLine 900 is halted and control is passed back into the TimeLine 900 at "Entry2" shown at 932. Thus, it is possible to jump to a different place within a TimeLine. Near the end of the video 902 a mutually exclusive Activation Region 916 places three Buttons 918, 920 and 922 on the screen. If any of the buttons are pressed, the appropriate Go-To Spot on the active tail will branch the TimeLine 900 to either one of the entry spots 930 or 932 or to the beginning via Go-Back Spot 928.

FIG. 28 represents a simple example of the use of Actions on a StoryLine. As discussed above, an Action sends a particular set of instructions to all playing SVL objects connected to it through Action Lines. FIG. 28 illustrates a StoryLine 950 which begins at a Start Spot 952. When the first Call Spot 954 is reached, the Action 956 connected to Call Line 958 acts upon the media represented by Icon 960 through Action Line 962. In the particular Action illustrated, the media represented by the icon 960, if it has a visible representation and Icon 960 happens to be currently playing via some other StoryLine, TimeLine or Sequence, goes from color to black and white because the Action 956 represents the transition from color to black and white. After the media represented by the Icon 960 is played, StoryLine 950 proceeds to the next Call Spot 964 where a second Action 966 causes the media represented by the Icon 968 to both diminish in size as well as to fade out. Action 966 has associated with it, as does Action 956, a given duration in which to take the media, reduce it size and fade it out. When the media fades completely, play goes immediately to the End Spot 970. Of course, an Action may be used in connecting with an audio icon and may indicate the fade out of the audio segment.

Thus, the present invention allows the user to graphically, in a single, unidirectional StoryLine, illustrate the sequencing and connection of various video, audio and textual sequences to one another without having to watch the full sequence of events in real time. By the use of icons, the user may mix and match, compose, edit and reorganize icons representing sequences of media, action icons in a simple matter which can be viewed immediately for the editorial value for the user to determine he or she is satisfied with the composition.

Having described the embodiments of the invention, it should be apparent to that those skilled in the art that the foregoing is merely illustrative and not limiting having been presented by way of example only. Numerous modifications and other embodiments are within the scope of one of ordinary skill in the art and are contemplated as within the scope of the invention as defined by the appended claims.

What is claimed is:

1. A computer system having a graphical user interface for use in authoring a multimedia composition having one or more multimedia events, the computer system having a processor and a display screen coupled to the processor and an input device for receiving input from an author, the computer system comprising:

means for defining and displaying through the graphical user interface a representation of a first multimedia composition including a first start position which indicates a beginning of the first multimedia composition, a first end position which indicates an end of the first multimedia composition and a first unidirectional path line connecting the first start position and the first end position, means for defining and displaying through the graphical user interface a representation of a second multimedia composition including a second start position which indicates a beginning of the second multimedia composition, a second end position which indicates an end of the second multimedia composition, and a second unidirectional path line connecting the second start position and the second end positions, and means, responsive to input from the input device, for defining and displaying through the graphical user interface a link between the first and the second unidirectional path lines, wherein the displayed link includes a representation of at least one multimedia event shared by the first and second multimedia compositions, such that the first and second multimedia compositions may be played independent of each other.

2. The computer system of claim 1, wherein the link comprises at least one icon associated with a source of multimedia material, the at least one icon being linked to each of the first and second path lines through first and second respective call spots, wherein each call spot defines an operation of processing the icon linked to the call spot then returning to the path line containing the call spot such that operations performed after processing the icon are defined by a position of the call spot on the respective path line and independent of the icon.

3. A computer system having a graphical user interface for use in authoring a multimedia composition having one or more multimedia events, the computer system having a processor and a display screen coupled to the processor and an input device for receiving input from an author, the computer system comprising:

means for defining and displaying through the graphical user interface a representation of a first multimedia composition including a start position which indicates a beginning of the first multimedia composition, an end position which indicates an end of the first multimedia composition and a unidirectional path line connecting the start position and the end position, wherein the first multimedia composition starts at the start position, continues along the unidirectional path line and completes at the end position;

means for defining and displaying through the graphical user interface a representation of a second multimedia composition using a timeline having a start time and a representation of absolute time units with respect to the start time;

means for defining and displaying through the graphical user interface one or more representations of elements of the second multimedia composition on the timeline wherein each of the representations of elements has a defined time with respect to the start time and a duration in absolute time units;

means for associating one or more multimedia materials with the elements;

means for linking the timeline to the path line through a call spot, and wherein the multimedia materials associated with the elements of the timeline are presented when the call spot connecting the timeline to the path line is enabled along the path line.

4. A computer system having a graphical user interface for use in authoring a multimedia composition having one or more multimedia events, the computer system having a processor and a display screen coupled to the processor and an input device for receiving input from an author, the computer system comprising:

means for defining and displaying through the graphical user interface a representation of a first multimedia composition using a timeline having a start time and a representation of absolute time units with respect to the start time;

means for defining and displaying through the graphical user interface one or more representations of elements of the first multimedia composition on the timeline wherein each of the representations of elements has a defined time with respect to the start time and a duration in absolute time units;

means for associating one or more multimedia materials with the elements;

means for defining and displaying through the graphical user interface a representation of a second multimedia composition including a start position which indicates a beginning of the second multimedia composition, an end position which indicates an end of the second multimedia composition and a unidirectional path line connecting the start position and the end position, wherein the second multimedia composition starts at the start position, continues along the unidirectional path line and completes at the end position;

means for linking the timeline to the representation of the second multimedia composition by associating an element in the timeline to the representation of the second multimedia composition.

5. A computer system having a graphical user interface for use in authoring a multimedia composition having one or more multimedia events, the computer system having a processor and a display screen coupled to the processor and an input device for receiving input from an author, the computer system comprising:

means for defining and displaying through the graphical user interface a representation of a multimedia composition using a timeline having a start time and a representation of absolute time units with respect to the start time;

means for defining and displaying through the graphical user interface one or more representations of elements of the multimedia composition on the timeline wherein each of the representations of elements has a defined time with respect to the start time and a duration in absolute time units; and means for associating one or more multimedia materials with the elements;

wherein one of the representation of elements defined and displayed on the timeline has associated with it at least one call spot having a determinable position and duration on the timeline, and further wherein the call spot defines an operation of processing media linked to the call spot then returning to the path line containing the call spot such that operations performed after processing media are defined by a position of the call spot on the timeline and independent of the media.

6. The computer system of claim 5, further comprising at least one icon associated with the at least one call spot, the at least one icon being linked to a source of multimedia material in the computer system which may be played by the computer system, wherein the duration of the call spot on the timeline determines length of play of the multimedia material.

7. A computer system having a graphical user interface for use in authoring a multimedia composition having one or more multimedia events, the computer system having a processor and a display screen coupled to the processor and an input device for receiving input from an author, the computer system comprising:

means for defining and displaying through the graphical user interface a representation of a multimedia composition including a start position which indicates a beginning of the multimedia composition, an end position which indicates an end of the multimedia composition and a unidirectional path line connecting the start position and the end position, wherein the multimedia composition starts at the start position, continues along the unidirectional path line and completes at the end position;

means for linking at least one icon associated with a source of multimedia material to the path line; and wherein the at least one icon indicates a reference to an event space, the event space having a plurality of event handlers, wherein each event handler causes an event to occur with respect to the multimedia material with which the event space is associated upon occurrence of a predetermined action of the input device.

8. The computer system of claim 7 wherein the action comprises the movement by a user of the input device.

9. The computer system of claim 7, wherein the action comprises the movement by a user of a cursor using the input device.

10. The computer system of claim 7, wherein the plurality of event handlers affect the multimedia material in a plurality of ways.

11. The computer system of claim 7, wherein the action comprises the actuation by a user of a keyboard device.

12. A computer system having a graphical user interface for use in authoring a multimedia composition having one or more multimedia events, the computer system having a processor and a display screen coupled to the processor and an input device for receiving input from an author, the computer system comprising:

means for defining and displaying through the graphical user interface a representation of a multimedia composition including a start position which indicates a beginning of the multimedia composition, an end position which indicates an end of the multimedia composition and a unidirectional path line connecting the start position and the end position, wherein the multimedia composition starts at the start position, continues along the unidirectional path line and completes at the end position; and means, responsive to input from the input device, for defining and displaying a call spot on the path line and an icon linked to the call spot on the path line, wherein the call spot defines an operation of processing the icon linked to the call spot then returning to the path line containing the call spot such that operations after processing the icon are defined by the call spot and independent of the icon.

13. A computer system having a graphical user interface for use in authoring a multimedia composition having one or more multimedia events, the computer system having a processor and a display screen coupled to the processor and an input device for receiving input from an author, the computer system comprising:

means for defining and displaying through the graphical user interface a representation of a first multimedia composition including a first start position which indicates a beginning of the first multimedia composition, a first end position which indicates an end of the first multimedia composition and a first unidirectional path line connecting the first start position and the first end position, means for defining and displaying through the graphical user interface a representation of a second multimedia composition including a second start position which indicates a beginning of the second multimedia composition, a second end position which indicates an end of the second multimedia composition, and a second unidirectional path line connecting the second start position and the second end positions, and means, responsive to input from the input device, for defining and displaying through the graphical user interface a link between the first and the second unidirectional path lines, wherein the displayed link includes a representation of at least one multimedia event shared by the first and second multimedia compositions.

14. The computer system of claim 13, wherein:
the first and second multimedia compositions are played independent of each other.

15. The computer system of claim 13, wherein:
the first and second multimedia compositions are played at a same time.

16. The computer system of claim 13, wherein:
the first and second multimedia compositions are played at an overlapping time.

17. A computer system having a graphical user interface for use in authoring a multimedia composition having one or more multimedia events, the computer system having a processor and a display screen coupled to the processor and an input device for receiving input from an author, the computer system comprising:

means for defining and displaying through the graphical user interface a representation of a multimedia composition including a start position which indicates a beginning of the multimedia composition, an end position which indicates an end of the multimedia composition and a unidirectional path line connecting the start position and the end position, wherein the multimedia composition starts at the start position, continues along the unidirectional path line and completes at the end position;

means for linking at least one icon associated with a source of multimedia material to the path line;

means for defining and displaying through the graphical user interface a representation of one or more event handlers; and wherein the at least one icon indicates a reference to an event space including the one or more event handlers, and each event handler causes an event to occur with respect to the multimedia material with which the event space is associated upon occurrence of a predetermined action of the input device.

18. A graphical user interface for use in a computer system for authoring a multimedia composition having one or more multimedia events, the computer system having a processor and a display screen coupled to the processor and an input device for receiving input from an author, the graphical user interface comprising:

means for defining and displaying a representation of a first multimedia composition including a first start position which indicates a beginning of the first multimedia composition, a first end position which indicates an end of the first multimedia composition and a first unidirectional path line connecting the first start position and the first end position, means for defining and displaying a representation of a second multimedia composition including a second start position which indicates a beginning of the second multimedia composition, a second end position which indicates an end of the second multimedia composition, and a second unidirectional path line connecting the second start position and the second end positions, and means, responsive to input from the input device, for defining and displaying a link between the first and the second unidirectional path lines, wherein the link includes a representation of at least one multimedia event shared by the first and second multimedia compositions.

19. A computer program product for use with a computer system having a graphical user interface for use in authoring a multimedia composition having one or more multimedia events, the computer system having a processor and a display screen coupled to the processor and an input device for receiving input from an author, the computer program product comprising a computer usable medium having embodied therein computer readable program code comprising:

means for defining and displaying through the graphical user interface a representation of a first multimedia composition including a first start position which indicates a beginning of the first multimedia composition, a first end position which indicates an end of the first multimedia composition and a first unidirectional path line connecting the first start position and the first end position, means for defining and displaying through the graphical user interface a representation of a second multimedia composition including a second start position which indicates a beginning of the second multimedia composition, a second end position which indicates an end of the second multimedia composition, and a second unidirectional path line connecting the second start position and the second end positions, and means, responsive to input from the input device, for defining and displaying through the graphical user interface a link between the first and the second unidirectional path lines, wherein the link includes a representation of at least one multimedia event shared by the first and second multimedia compositions.

\* \* \* \* \*